United States Patent
Wang et al.

(10) Patent No.: US 10,584,525 B2
(45) Date of Patent: Mar. 10, 2020

(54) BLDC WINDOW LIFT MOTOR SYSTEM

(71) Applicant: MAGNA CLOSURES INC., Newmarket (CA)

(72) Inventors: Liping Wang, Markham (CA); Steven J. Liu, Richmond Hill (CA); Michael Bayley, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 16/430,731

(22) Filed: Jun. 4, 2019

(65) Prior Publication Data

US 2019/0284860 A1     Sep. 19, 2019

Related U.S. Application Data

(63) Continuation of application No. 15/257,180, filed on Sep. 6, 2016, now Pat. No. 10,337,231.

(Continued)

(51) Int. Cl.
    *H02K 13/00*     (2006.01)
    *E05F 15/603*     (2015.01)
    (Continued)

(52) U.S. Cl.
    CPC .......... *E05F 15/603* (2015.01); *E05F 15/659* (2015.01); *E05F 15/662* (2015.01); *E05F 15/695* (2015.01); *E05F 15/697* (2015.01); *H02K 1/12* (2013.01); *H02K 7/116* (2013.01); *H02K 7/1166* (2013.01); *H02K 11/38* (2016.01); *E05Y 2900/531* (2013.01); *E05Y 2900/55* (2013.01); *H02K 7/081* (2013.01)

(58) Field of Classification Search
    CPC ..... E05F 15/603; E05F 15/662; E05F 15/659; E05F 15/697; E05F 15/695; H02K 1/12; H02K 7/116; H02K 11/38; H02K 7/1166; H02K 7/081; H02K 7/125; E05Y 2900/55; E05Y 2900/531; B60S 1/166; B60S 1/583; E05B 81/25; E05B 81/13
    USPC ... 49/324, 348, 374, 372, 349, 362, 360, 72; 310/12.14, 112, 209, 80, 83
    See application file for complete search history.

(56) References Cited

U.S. PATENT DOCUMENTS 3,228,677 A     1/1966    Martens
5,063,317 A    11/1991    Bruhn
(Continued)

*Primary Examiner* — Chi Q Nguyen
(74) *Attorney, Agent, or Firm* — Dickinson Wright, PLLC; Philip Edward Rettig

(57) ABSTRACT

A powered actuator unit for use in a closure system of a motor vehicle. The powered actuator unit includes a common housing configured to house a brushless DC (BLDC) electronic motor unit, a gear drive unit, a shift support arrangement, and a controller arrangement. The motor unit has a stator unit that includes a plurality of electromagnetic subassemblies each having a carrier and a winding unit. The carrier includes an outer ring segment being planar and an inner ring segment being arcuate and a web segment interconnecting the outer ring segment and the inner ring segment and the plurality of electromagnetic subassemblies are each adapted to abut one another in an annular arrangement upon assembly. The outer ring segments define an outer peripheral surface of the stator unit having a polygonal cross-section and the inner ring segments define a rotor cavity having a circular cross-section.

21 Claims, 28 Drawing Sheets

Related U.S. Application Data

(60) Provisional application No. 62/345,243, filed on Jun. 3, 2016, provisional application No. 62/233,469, filed on Sep. 28, 2015.

(51) Int. Cl.
  *H02K 7/116* (2006.01)
  *H02K 11/38* (2016.01)
  *E05F 15/659* (2015.01)
  *E05F 15/662* (2015.01)
  *E05F 15/695* (2015.01)
  *E05F 15/697* (2015.01)
  *H02K 1/12* (2006.01)
  *H02K 7/08* (2006.01)

(56) References Cited

U.S. PATENT DOCUMENTS

| | | | |
|---|---|---|---|
| 5,309,677 A | 5/1994 | Kunert et al. | |
| 5,844,382 A | 12/1998 | Dan | |
| 5,998,899 A * | 12/1999 | Rosen | F16C 32/0446 310/112 |
| 6,075,289 A * | 6/2000 | Distefano | H01L 23/3121 257/699 |
| 6,075,298 A | 6/2000 | Maue et al. | |
| 6,242,824 B1 * | 6/2001 | Torii | H02K 7/112 29/596 |
| 6,707,188 B2 * | 3/2004 | Torii | H02K 7/1166 310/100 |
| 7,005,764 B2 * | 2/2006 | Petersen | H02K 16/04 310/112 |
| 7,342,338 B2 * | 3/2008 | Miyazaki | H02K 1/278 310/112 |
| 7,847,443 B2 * | 12/2010 | Farnia | H02K 1/148 310/209 |
| 7,861,462 B2 | 1/2011 | Smith et al. | |
| 8,096,080 B2 | 1/2012 | Pavlovic et al. | |
| 8,366,175 B2 | 2/2013 | Schmitt | |
| 2003/0089042 A1 | 5/2003 | Oberheide et al. | |
| 2004/0187391 A1 | 9/2004 | Fenelon | |
| 2006/0033392 A1 * | 2/2006 | Ritchey | H02K 7/108 310/112 |
| 2007/0180773 A1 | 8/2007 | Fortin et al. | |
| 2011/0283622 A1 * | 11/2011 | Yoshida | E05F 11/486 49/349 |
| 2013/0147285 A1 * | 6/2013 | Mader | H02K 16/00 310/12.14 |
| 2014/0041303 A1 | 2/2014 | Broadhead et al. | |
| 2014/0208656 A1 | 7/2014 | Fortin et al. | |
| 2015/0263572 A1 * | 9/2015 | Hyppias | H02K 29/03 310/83 |
| 2015/0311756 A1 * | 10/2015 | Sullivan | H02K 1/2793 310/12.14 |
| 2016/0129768 A1 | 5/2016 | Elie et al. | |
| 2018/0202212 A1 | 7/2018 | Xiao et al. | |

* cited by examiner

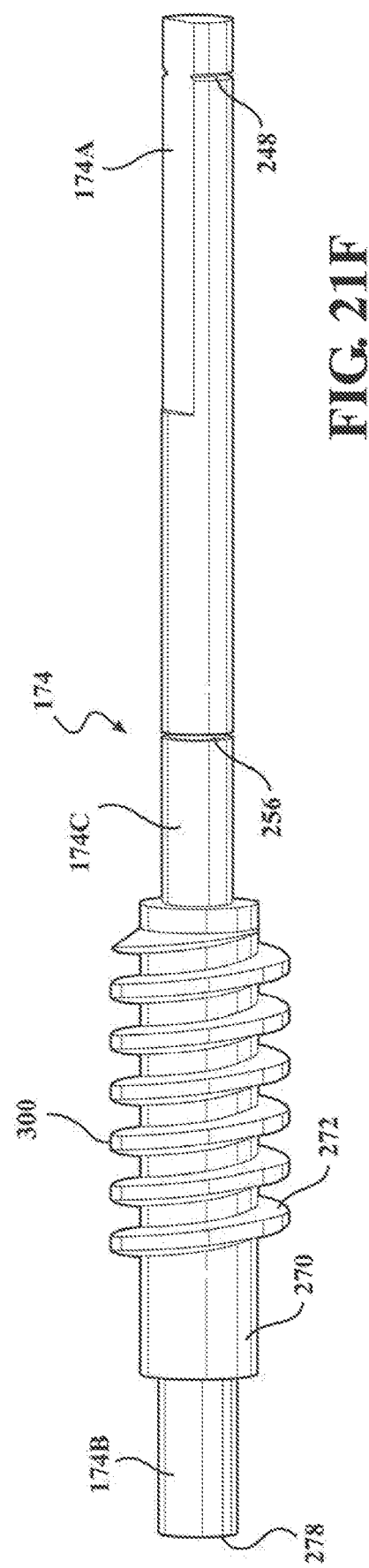

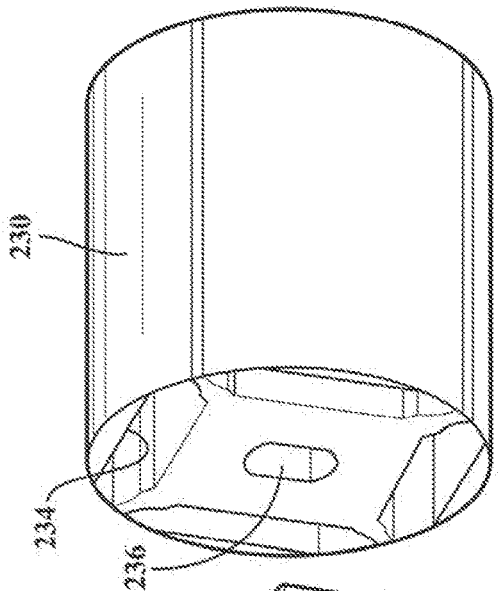
FIG. 23
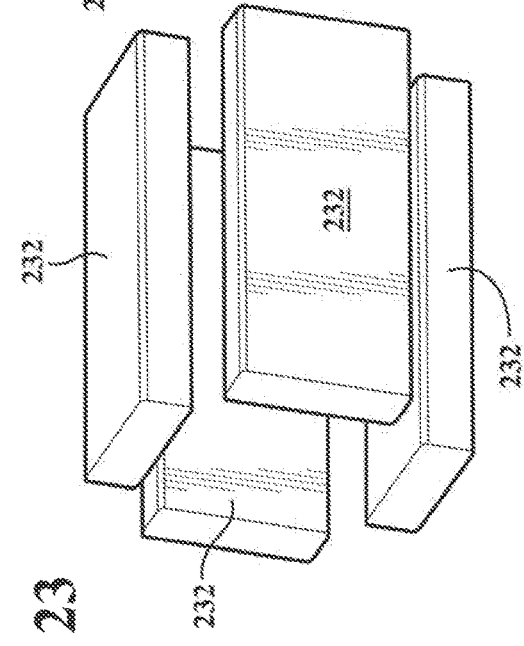
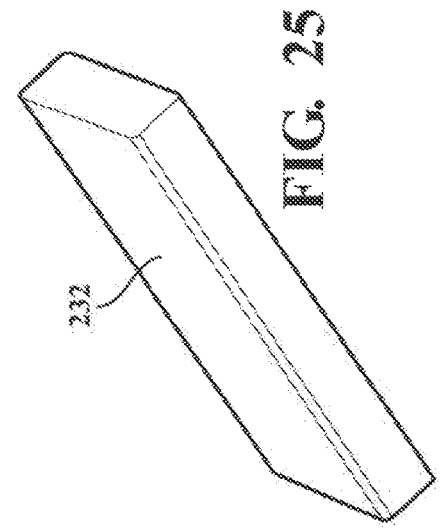
FIG. 25
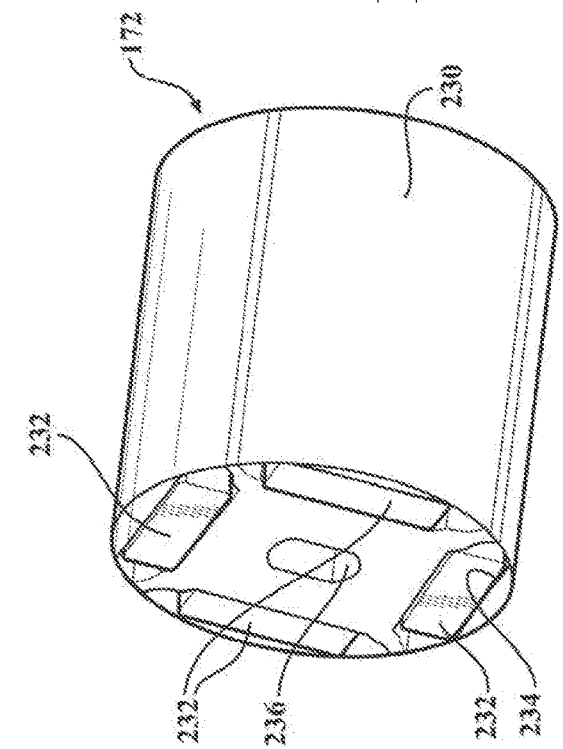
FIG. 24

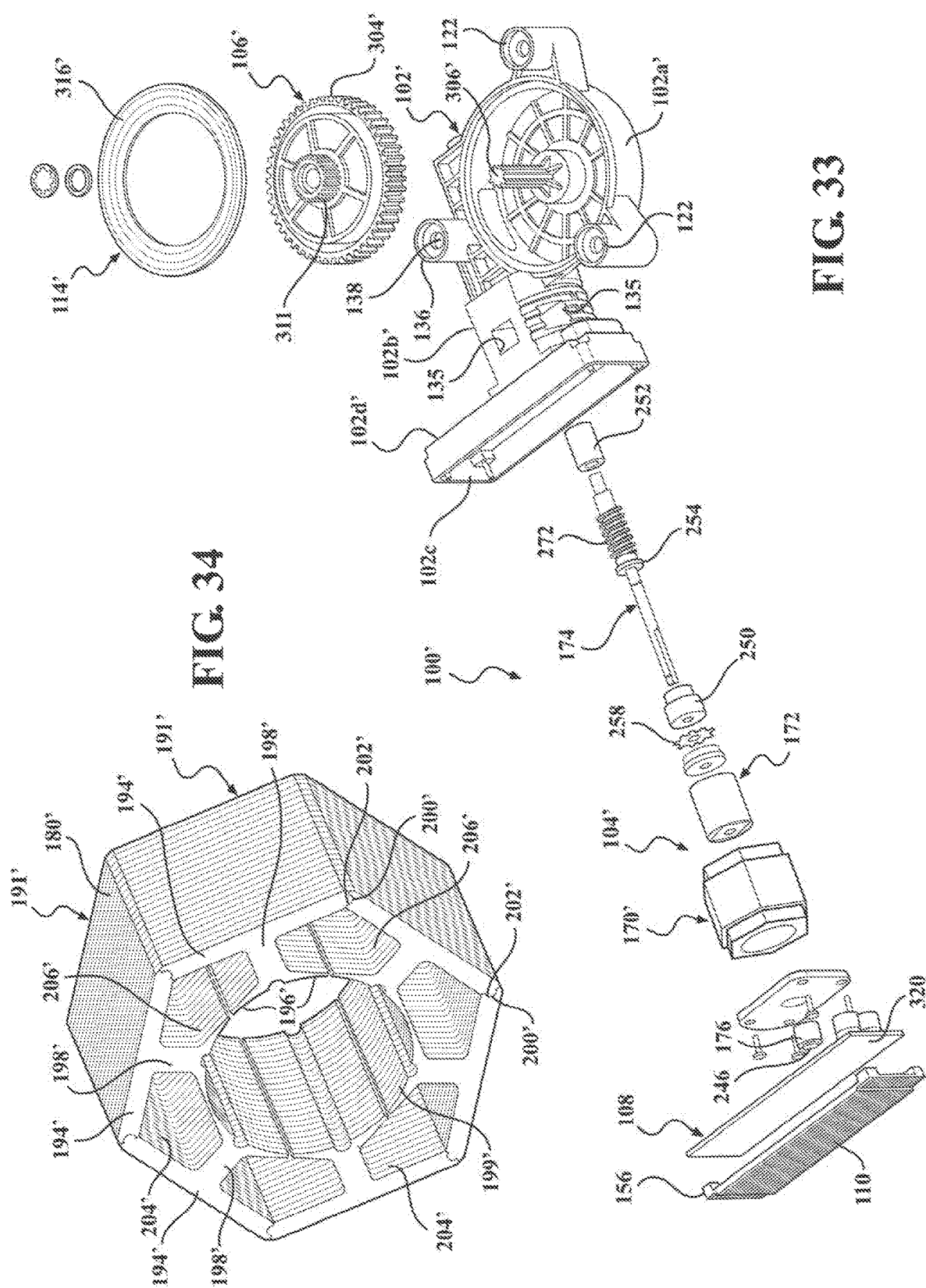

BLDC WINDOW LIFT MOTOR SYSTEM

CROSS REFERENCE TO RELATED APPLICATIONS

This application is a continuation of U.S. application Ser. No. 15/257,180 filed Sep. 6, 2016, now U.S. Pat. No. 10,337,231, which claims the benefit of U.S. Provisional Application Ser. No. 62/233,469 filed Sep. 28, 2015 and U.S. Provisional Application Ser. No. 62/345,243 filed Jun. 3, 2016, the entire disclosures of each of which are incorporated herein by reference.

FIELD

The present disclosure relates generally to power-operated actuators configured to control movement of a moveable closure component associated with a motor vehicle. More specifically, the present disclosure is directed to a powered actuator unit for a window lift system equipped with a brushless electric DC (BLDC) motor and a drive mechanism.

BACKGROUND

This section provides background information related to the technology associated with the present disclosure and, as such, is not necessarily prior art.

Modern motor vehicles are routinely equipped with one or more power-operated closure systems having a powered actuator unit and a moveable closure member driven between at least two positions by the powered actuator unit. Non-limiting examples of such power-operated closure systems may include power sliding doors, power liftgates, power door locks, and power windows. In association with a majority of these power-operated closure systems, the powered actuator unit includes an electric motor and a reduction gearset driven by the electric motor which, in turn, drives a drive mechanism that is operable to cause movement of the closure member in coordination with actuation of the electric motor. In most conventional closure systems, the electric motor associated with the powered actuator unit is of the type commonly referred to as brushed DC motors due to several factors including, but not limited to, cost and packaging limitation.

One type of power-operated closure system which has potential for utilization of advanced powered actuator units is power window lift systems. As is known, most window lift systems employ an arrangement commonly referred to as a "window regulator" to raise and lower a door window between open and closed positions. Two popular types of conventional window regulators are classified as "single rail" window regulators and "dual rail" window regulators. Single rail window regulators typically have a lift member that is slideably mounted on a rail secured to a structural component located inside the door frame. The window is mounted to the lift member. A drive mechanism, driven by the powered actuator unit, is configured to move the lift member along the rail for raising or lowering the window. An example of a cable-type drive mechanism associated with a powered single rail window regulator is disclosed in U.S. Publication No. US 2007/0180773. An example of a jackscrew-type drive mechanism associated with a powered single rail window regulator is disclosed in U.S. Pat. No. 7,861,462. Dual rail window regulators are similar to single rail window regulators except that they use a pair of parallel, spaced-apart rails instead of one. Dual rail window regulators typically include a pair of distinct lift members, each associated with one of the rails. Alternatively, a single lift member can be used that is configured to span between the laterally-spaced rails. Examples of cable-type drive mechanisms interconnecting the powered actuator unit and the lift member(s) of a dual rail window regulator are disclosed in U.S. Pat. No. 8,096,080 and U.S. Publication Nos. US 2014/0041303 and US 2014/0208656.

While commercially available power-operated closure systems used in motor vehicles are satisfactory for their intended purpose, a need exists to advance the art and provide alternative solutions capable of providing advantages and features directed to improved performance, service life, packaging efficiency, and/or cost.

SUMMARY

This section provides a general summary of some aspects, features and advantages provided by or associated with the inventive concepts hereinafter disclosed in accordance with the present disclosure and is not intended to be a comprehensive summation and/or limit the interpretation and scope of protection afforded by the claims.

It is an object of the present disclosure to provide a powered actuator unit for use with power-operated closure systems in motor vehicles.

It is a related object of the present disclosure to provide a powered actuator unit for use with a power window lift system to control movement of a door window between raised (i.e., closed) and lowered (i.e., open) positions.

The present disclosure is directed to a power-operated closure system for use in a motor vehicle to move a closure member between open and closed positions, comprising: a drive mechanism coupled to the closure member and operable in a first position for locating the closure member in its open position and operable in a second position for locating the closure member in its closed position; and a powered actuator unit operable for controlling movement of the drive mechanism between its first and second positions, the powered actuator unit including an actuator housing, a brushless DC (BLDC) electric motor assembly, a geared reduction unit, a controller unit, and a support arrangement all of which are integrated into the actuator housing.

In this regard, the powered actuator unit is readily adapted for use in a power-operated closure system including, but not limited to, window lift systems, cinch systems, strut/spindle liftgate systems, sunroof systems, power door systems and the like.

In accordance with a related aspect, the power-operated closure system of the present disclosure defines a window lift system, wherein the moveable closure member is a window, wherein the drive mechanism is a window regulator fixed to a door of the motor vehicle and which has at least one moveable lift plate supporting the window, and wherein the powered actuator unit is operable to move the lift plate between the first and second positions.

In accordance with another related aspect, the power-operated closure system of the present disclosure is configured such that the actuator housing is fixed to the door of the motor vehicle, wherein the actuator housing is configured to define a gear chamber, a shaft chamber communicating with the gear chamber, a motor chamber communicating with the motor shaft chamber, and a controller chamber communicating with the motor chamber, wherein the BLDC electric motor assembly includes a stator unit non-rotatably mounted in the motor chamber, a rotor unit disposed within the stator unit for rotation about a central axis, and a motor shaft disposed in the shaft chamber for rotation about the central axis and which is fixed for rotation with the rotor unit, wherein the geared reduction unit includes a worm driven by the motor shaft having threads meshed with gear teeth of a drive gear rotatably supported in the gear chamber, and wherein the support arrangement includes a pair of laterally-spaced bushings located in the shaft chamber and rotatably supporting the motor shaft, the bushings being positioned on opposite sides of the worm.

The power-operated closure system of the present disclosure is further configured such that the support arrangement includes an end support bushing mounted in a terminal end of the motor shaft chamber and housing an element in engagement with a terminal end of the motor shaft to provide a shaft centering function.

The power-operated closure system of the present disclosure is arranged such that the actuator housing is a one-piece component configured to define a gear chamber, a shaft chamber communicating with the gear chamber, a motor chamber communicating with the shaft chamber, and a controller chamber communicating with the motor chamber, wherein the BLDC electric motor assembly includes a stator unit non-rotatably mounted in the motor chamber, a rotor unit disposed within the stator unit for rotation about a central axis, and a motor shaft disposed in the shaft chamber for rotation about the central axis and which is fixed for rotation with the rotor unit, wherein the geared reduction unit includes a first gear fixed to the motor shaft which is meshed with a second gear rotatably supported in the gear chamber, and wherein the support arrangement includes a pair of laterally-spaced bushings located in the motor shaft chamber and rotatably supporting the motor shaft, the bushings being positioned on opposite sides of the first gear.

The power-operated closure system of the present invention is further configured such that the support arrangement also includes an end support bushing mounted in an end portion of the motor shaft chamber and having an element engaging a terminal end of the motor shaft to provide a centering function.

The present disclosure is also directed to a stator unit for a BLDC electric motor assembly. The stator unit includes a plurality of electromagnetic subassemblies each including a carrier and a winding unit. Each carrier includes an outer ring segment that is planar and an inner ring segment that is arcuate. Each carrier also includes a web segment that interconnects the outer ring segment and the inner ring segment. The plurality of electromagnetic subassemblies are each adapted to abut one another in an annular arrangement upon assembly. When assembled, the outer ring segments define an outer peripheral surface of the stator unit that has a polygonal cross-section and the inner ring segments define a rotor cavity of the stator unit that has a circular cross-section.

The present disclosure is additionally directed to a stator unit for a BLDC electric motor assembly. The stator unit includes a plurality of electromagnetic subassemblies each including a carrier and a winding unit. Each carrier includes an outer ring segment and an inner ring segment. Each carrier also includes a web segment interconnects the outer ring segment and the inner ring segment. The plurality of electromagnetic subassemblies are each adapted to abut one another in an annular arrangement upon assembly. When assembled, the outer ring segments define an outer peripheral surface of the stator unit and the inner ring segments define a rotor cavity of the stator unit. Each outer ring segment includes a first edge profile that is planar and a second edge profile opposite the first edge profile that is also planar for coupling with the planar first edge profile of another outer ring segment upon assembly of the plurality of electromagnetic subassemblies.

Further areas of applicability will become apparent from the description provided herein. The description and specific examples in this summary are only intended for purposes of illustration and are not intended to limit the scope of the present disclosure.

DRAWINGS

The drawings described herein are for illustrative purposes only of selected embodiments and not all possible or anticipated implementations thereof, and are not intended to limit the scope of the present disclosure.

Figure 2:
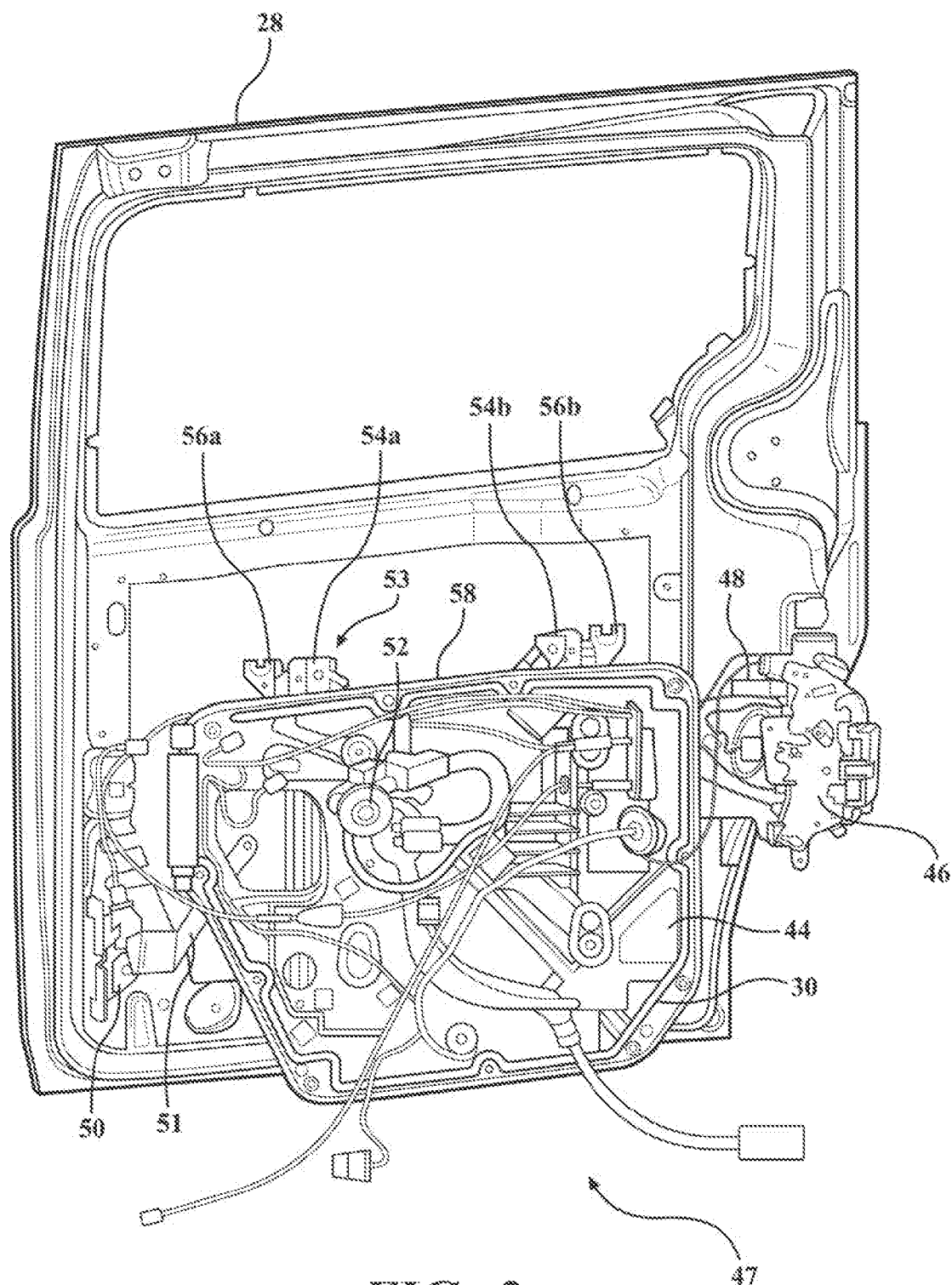
FIG. 2 is a perspective view of a portion of a door associated with the motor vehicle shown in FIG. 1 and illustrating a door module equipped with one or more prior art powered actuator units.
Figure 3:
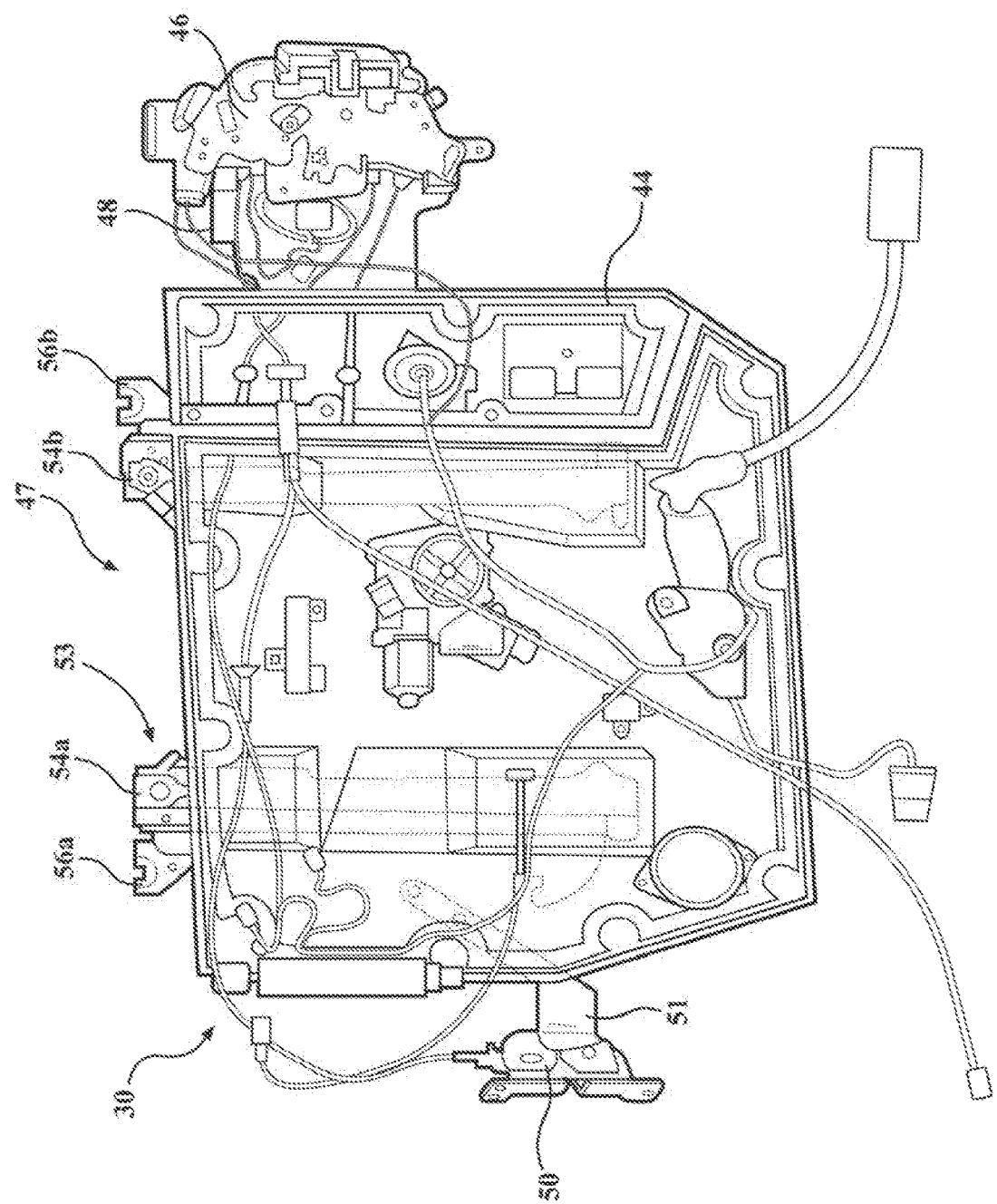
FIG. 3 is a plan view of the door module shown in FIG. 2.
Figure 4:
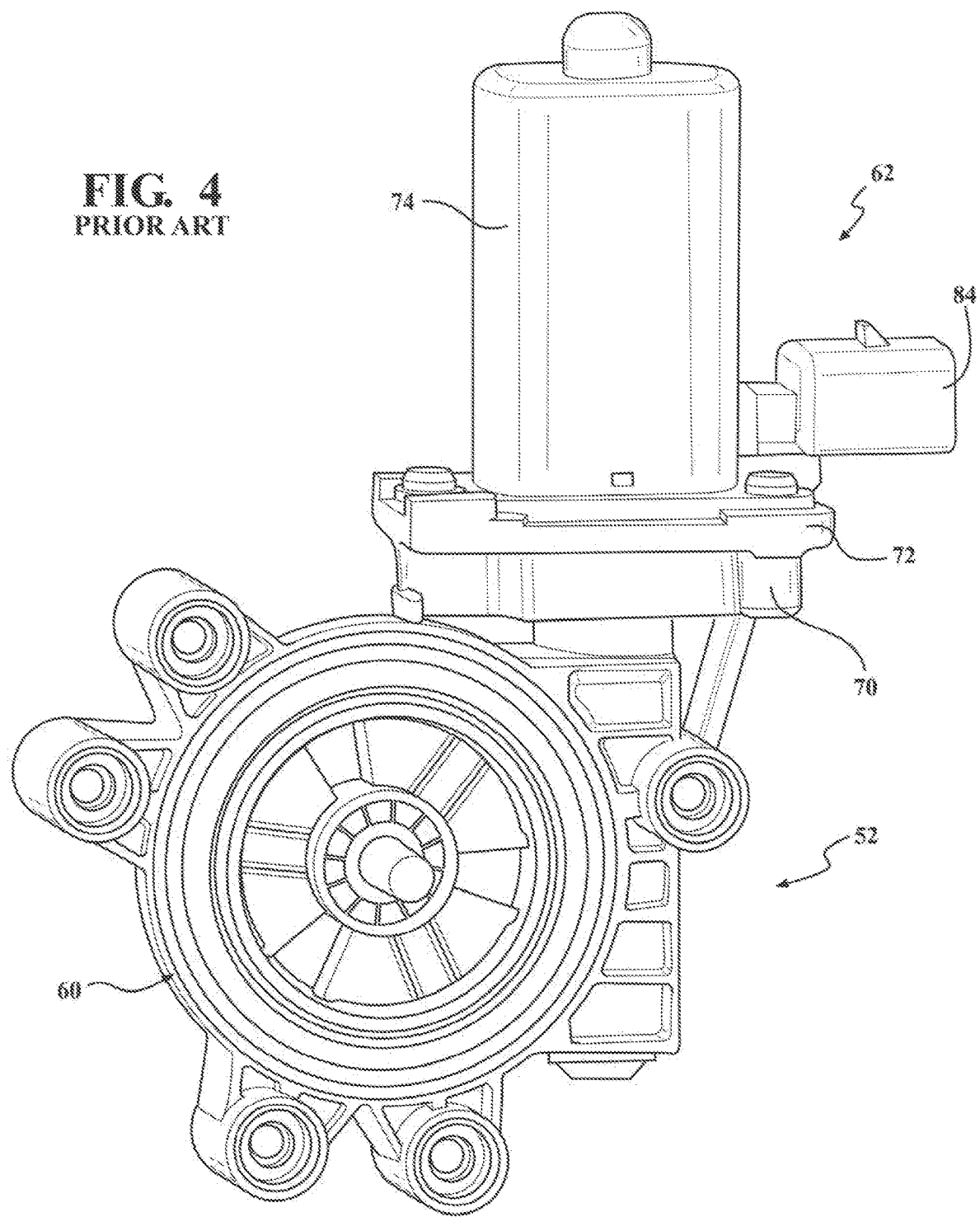
FIGS. 4 and 5 are pictorial views of a prior art powered actuator unit associated with a dual rail, cable-driven window regulator shown in FIGS. 2 and 3.
Figure 5:
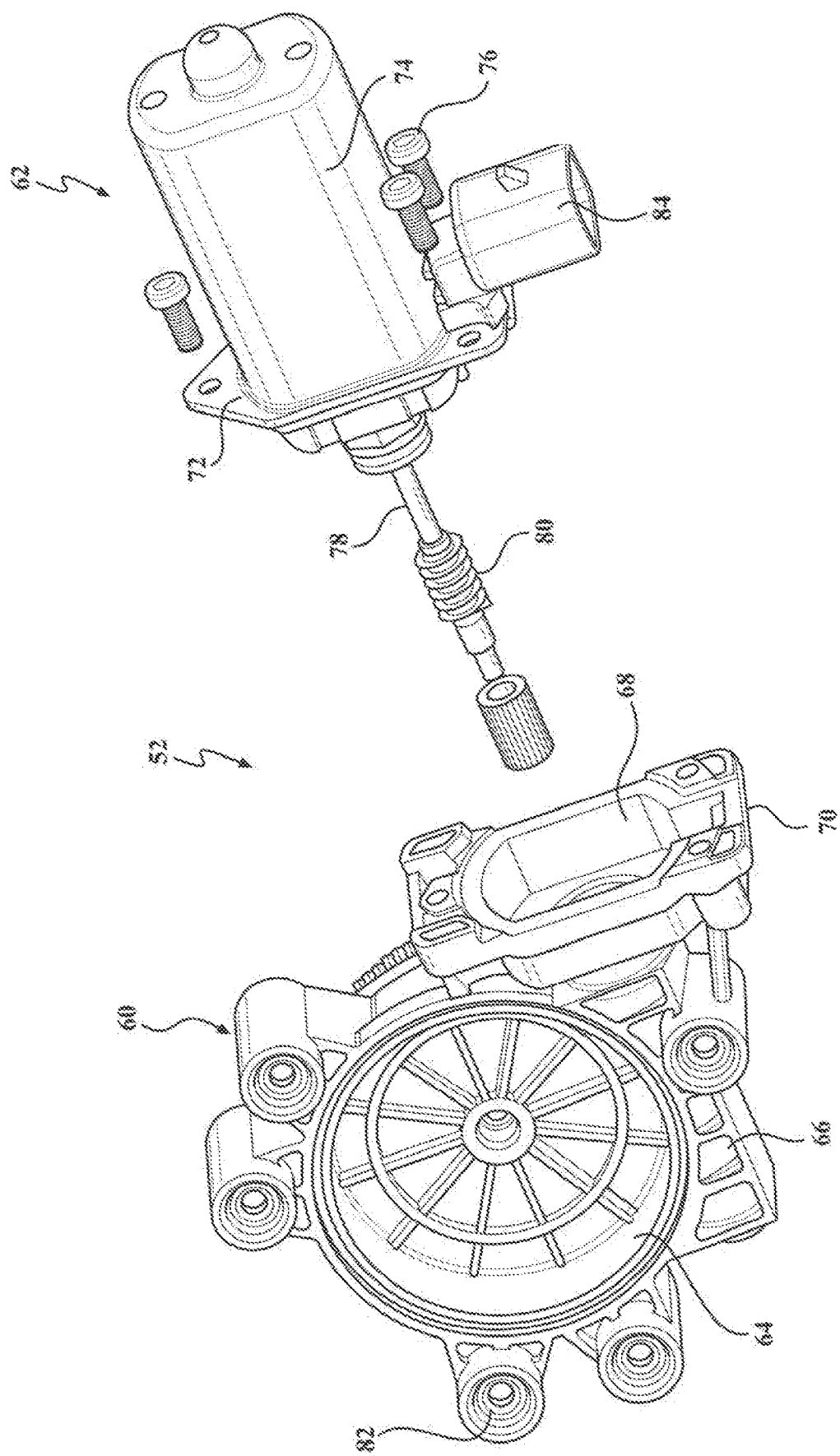
Figure 6:
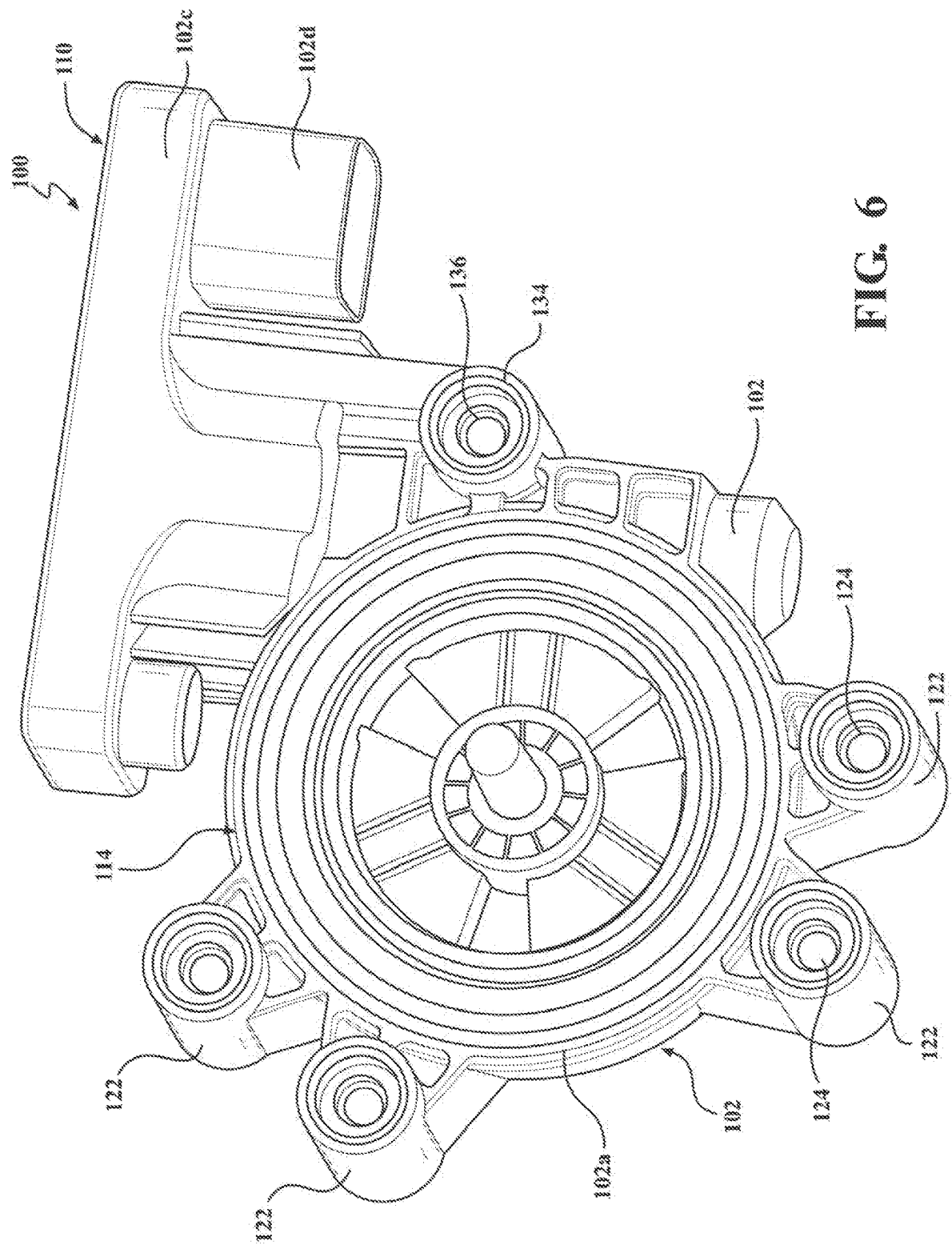
Figure 7:
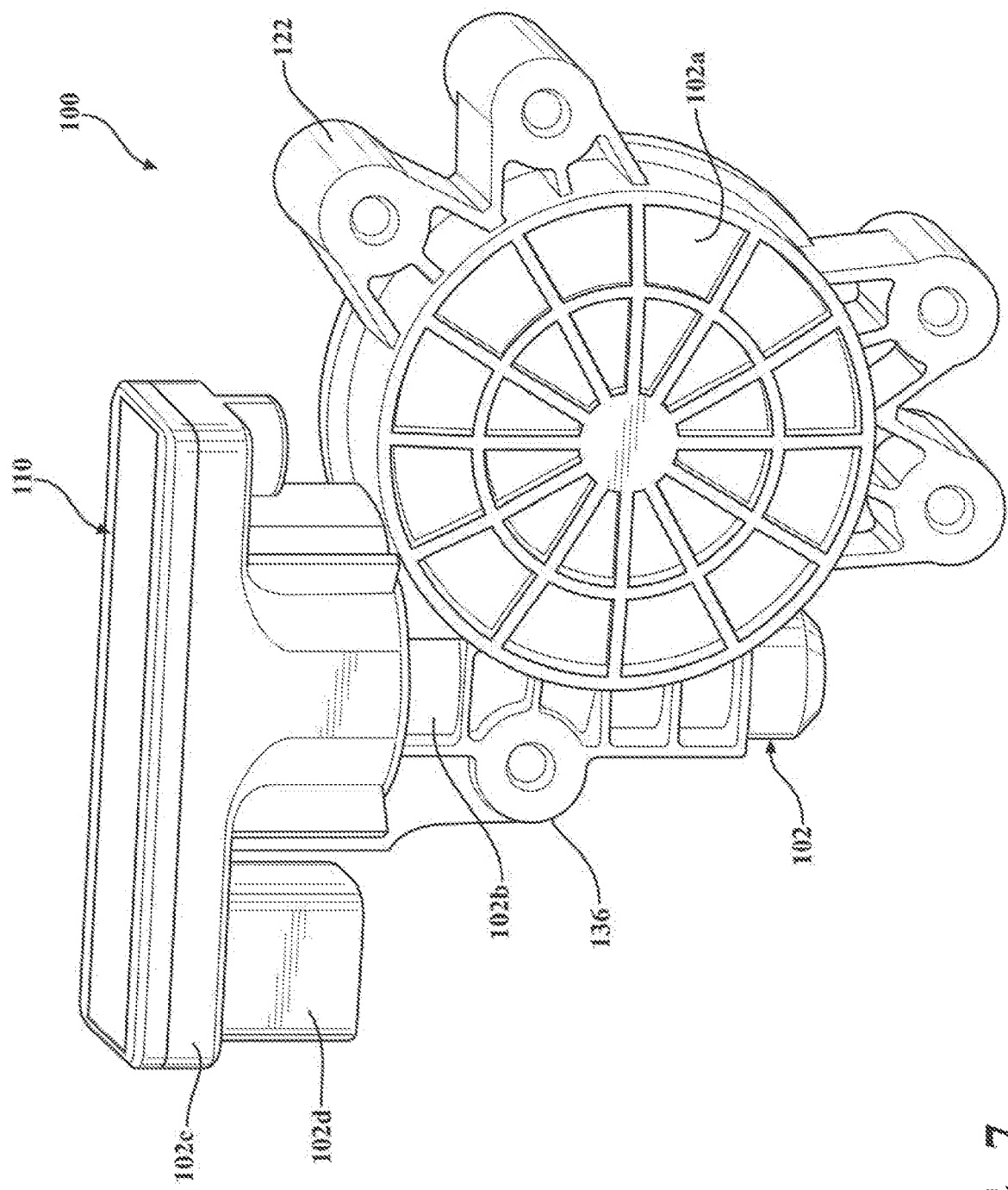
Figure 8:
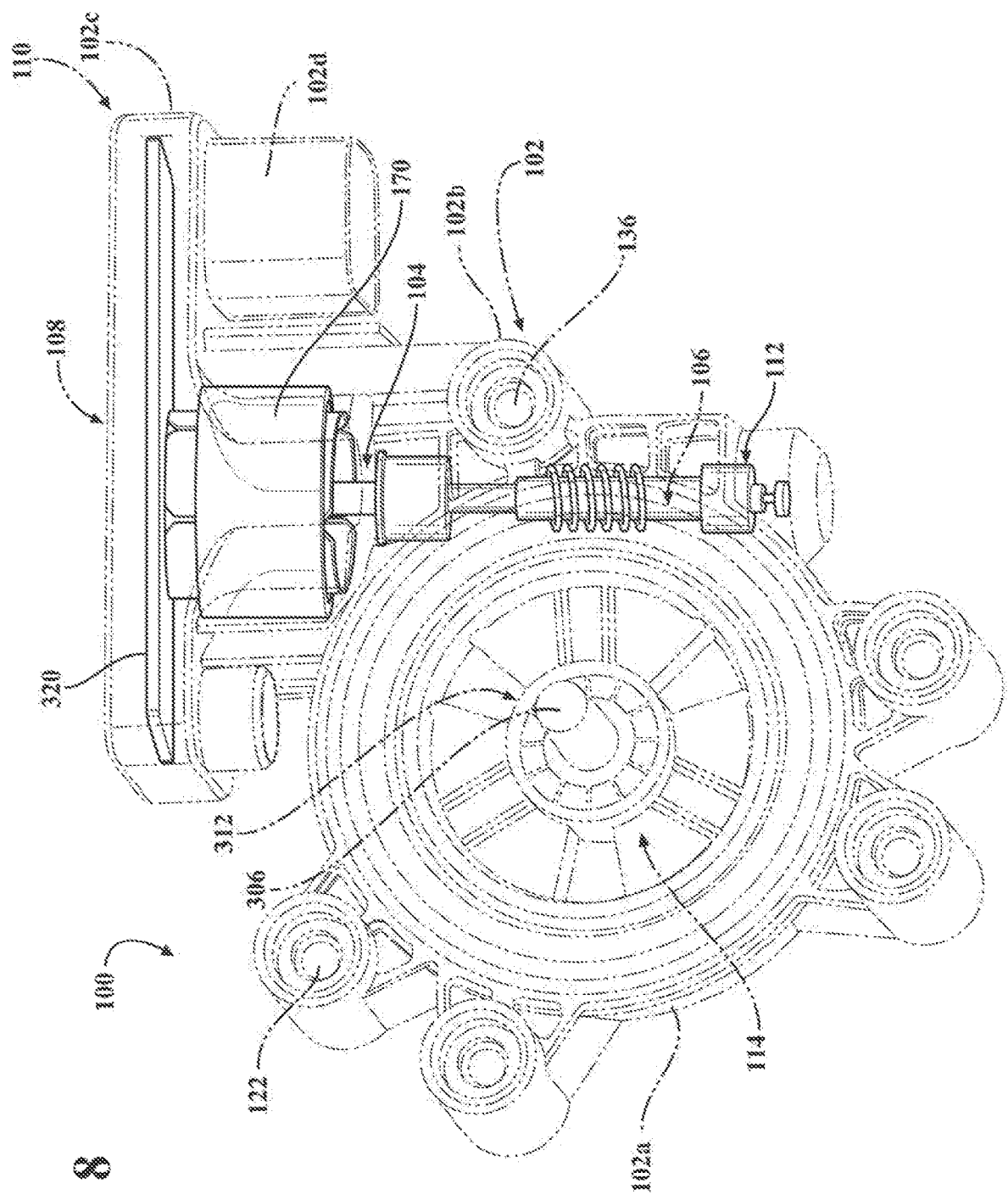
Figure 9:
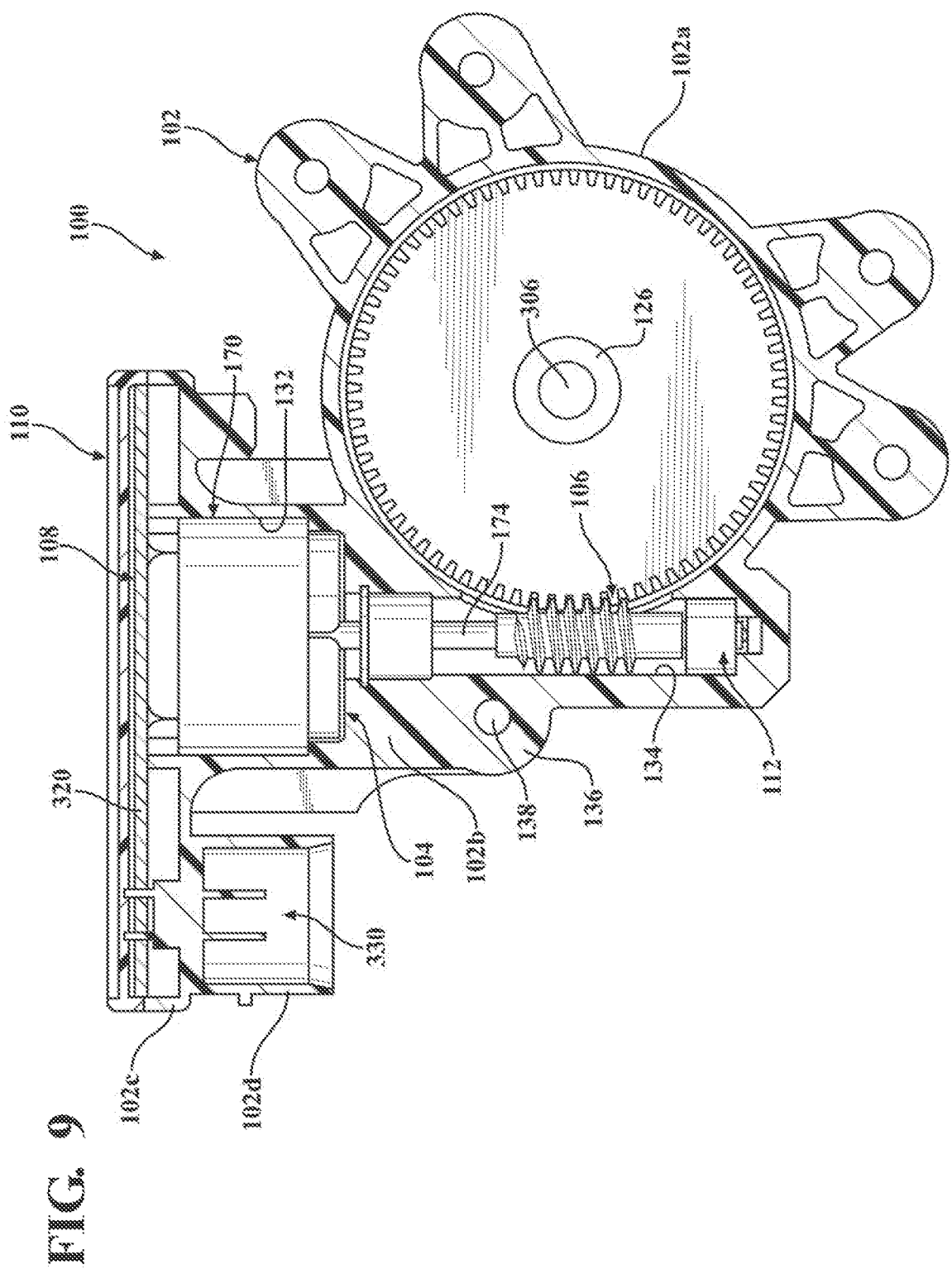
Figure 10:
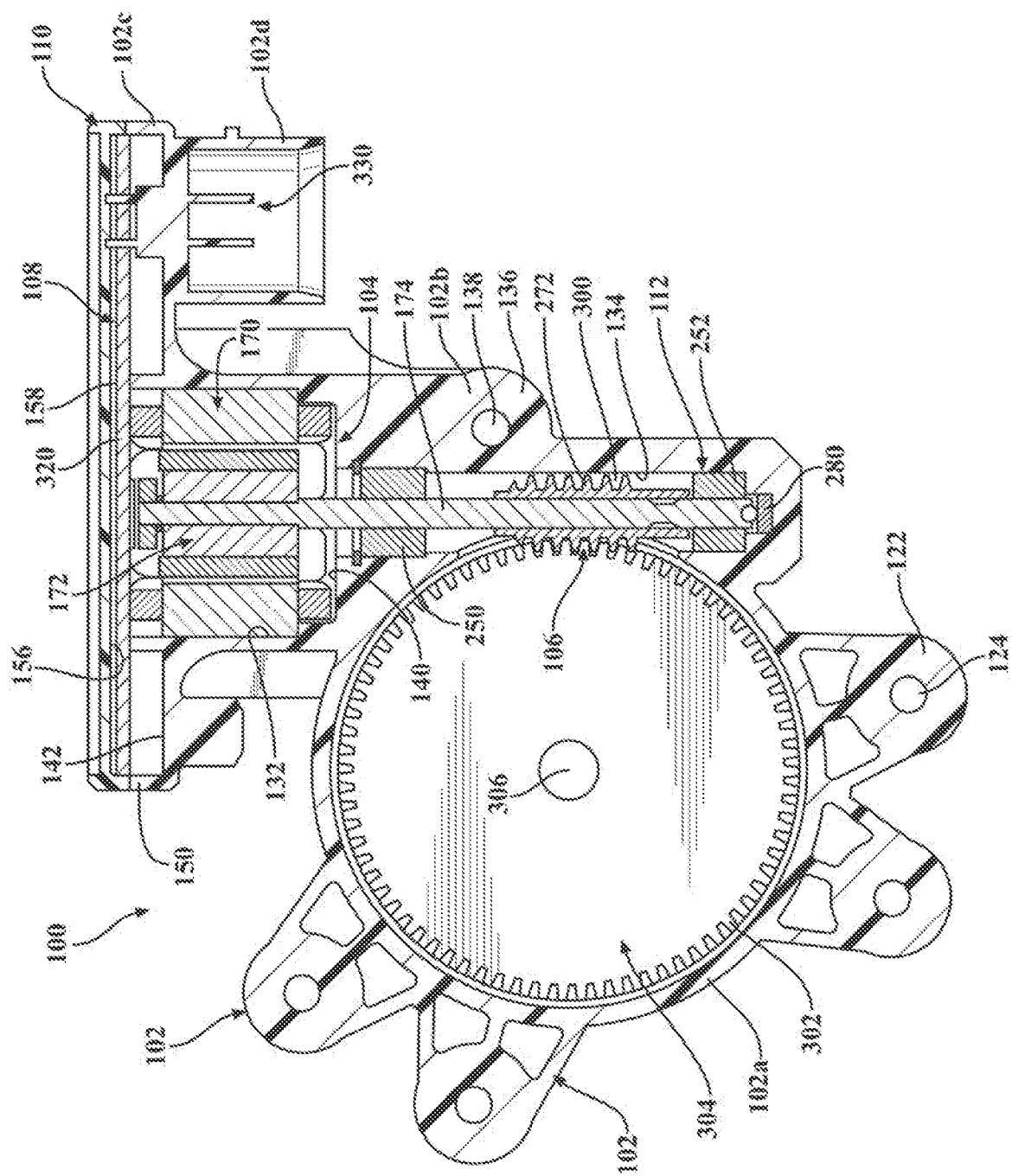
Figure 11:
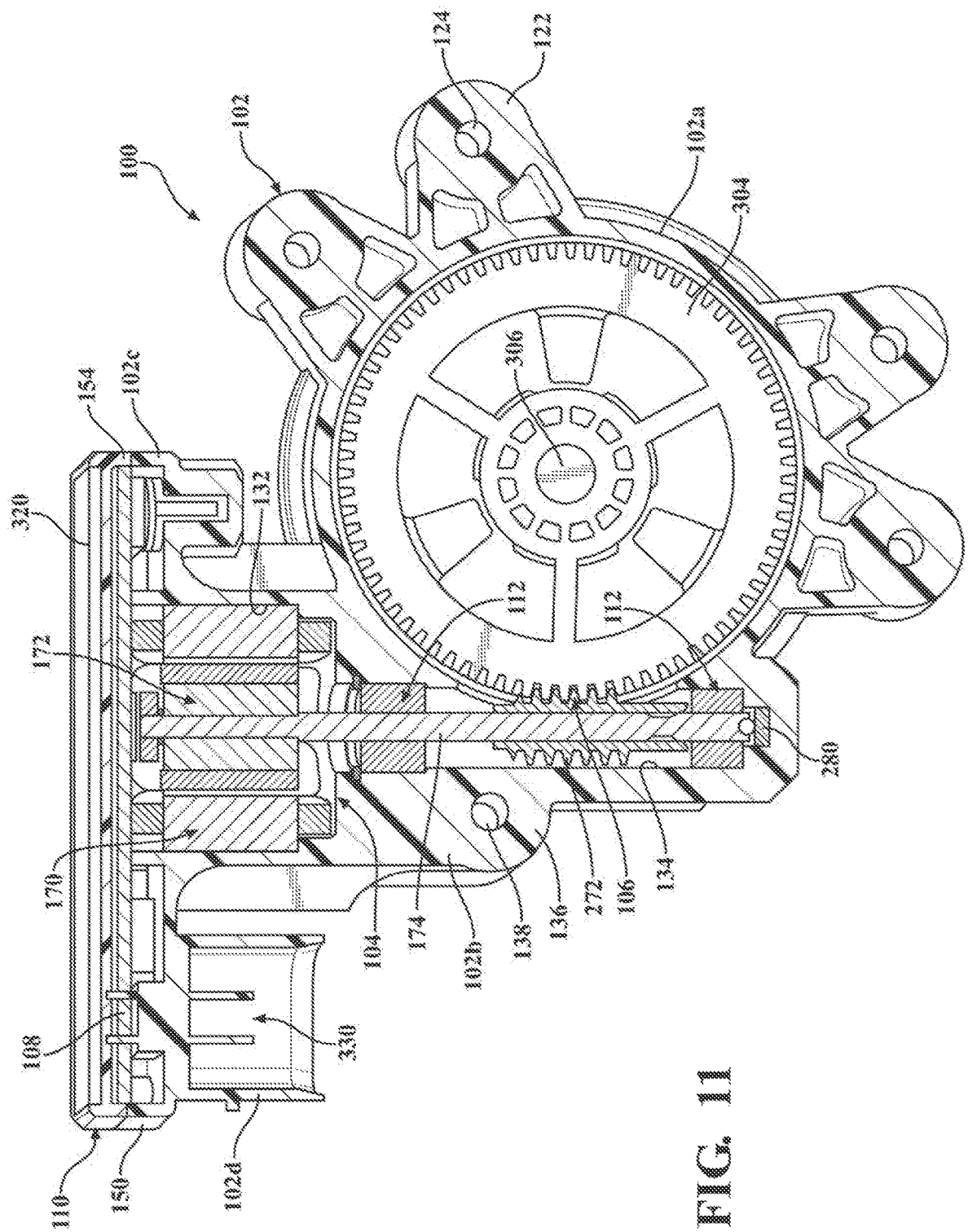
Figure 12:
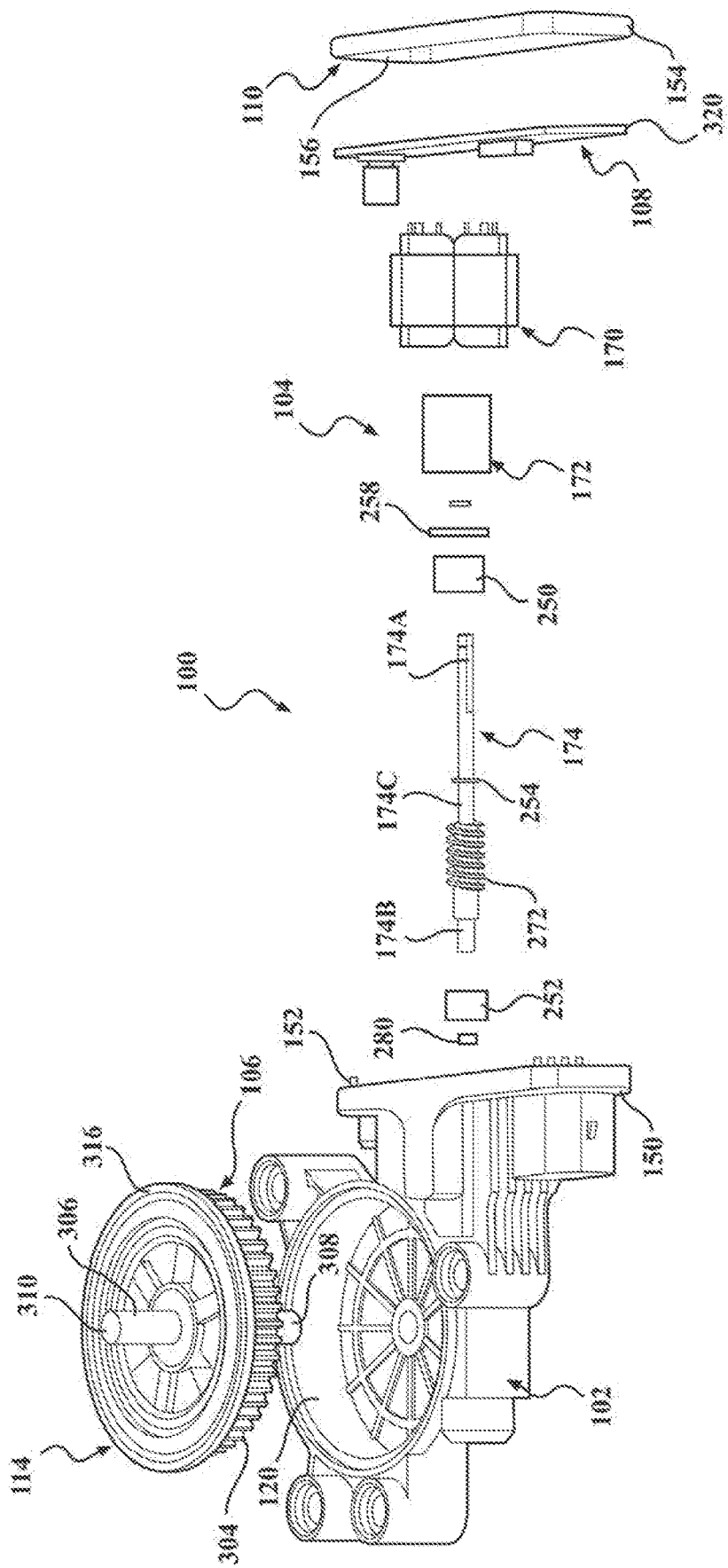
Figure 13:
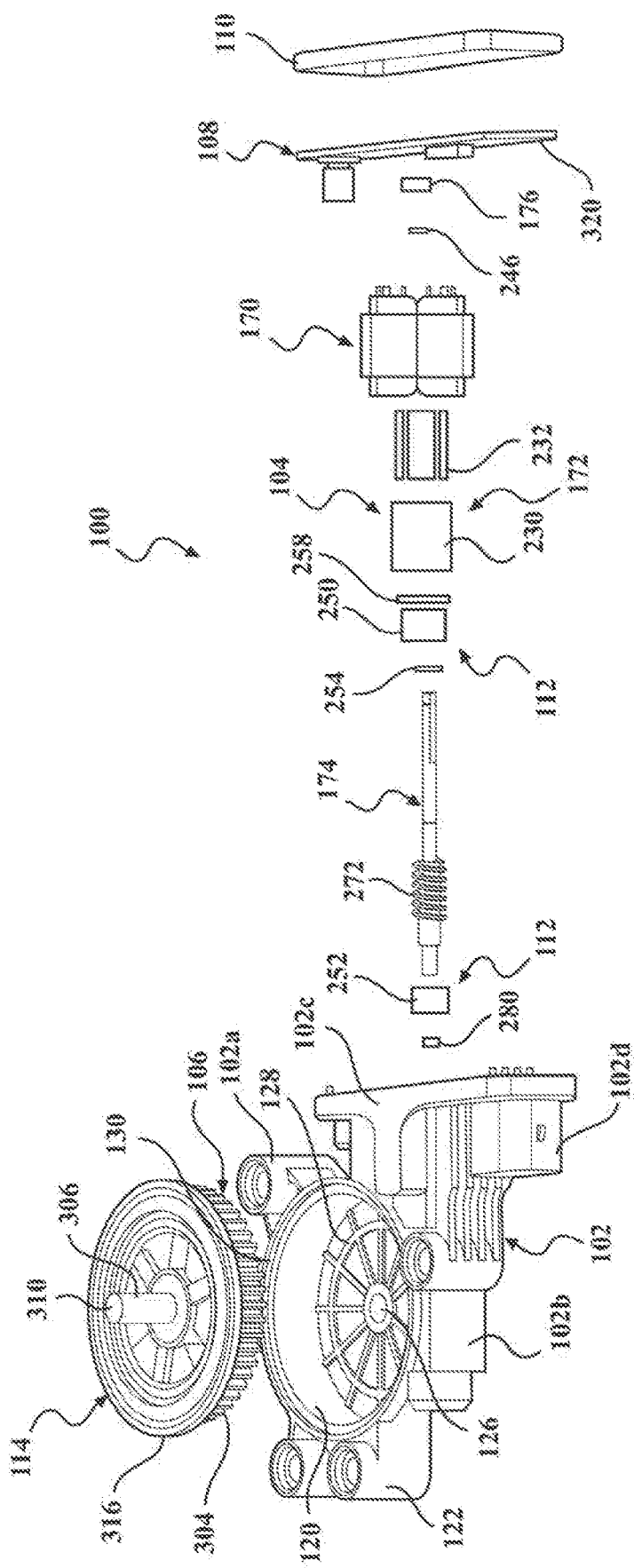
Figure 14:
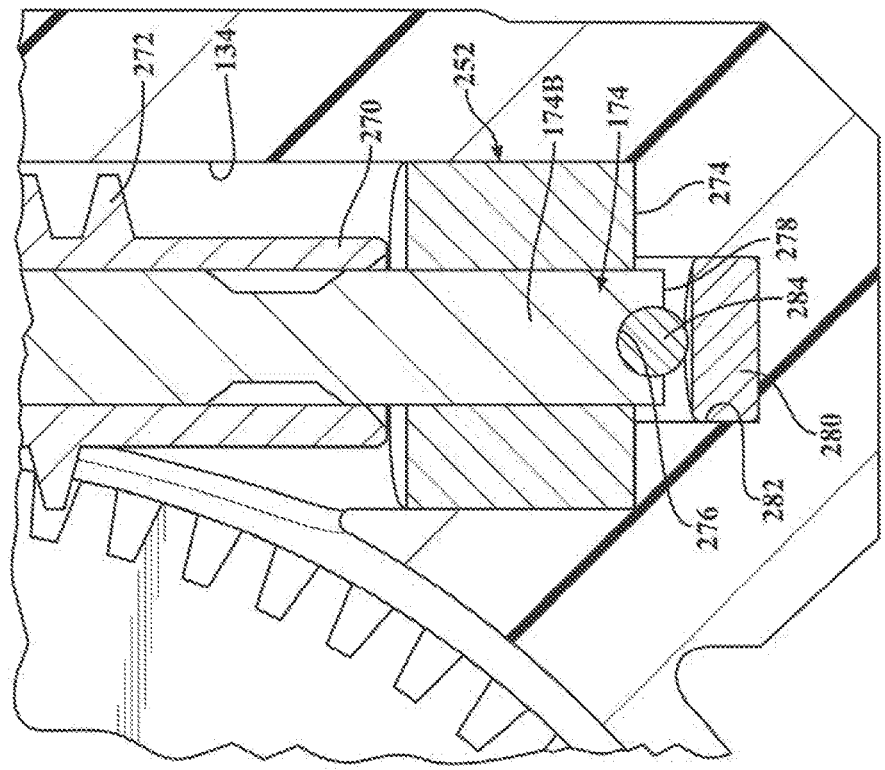
Figure 15:
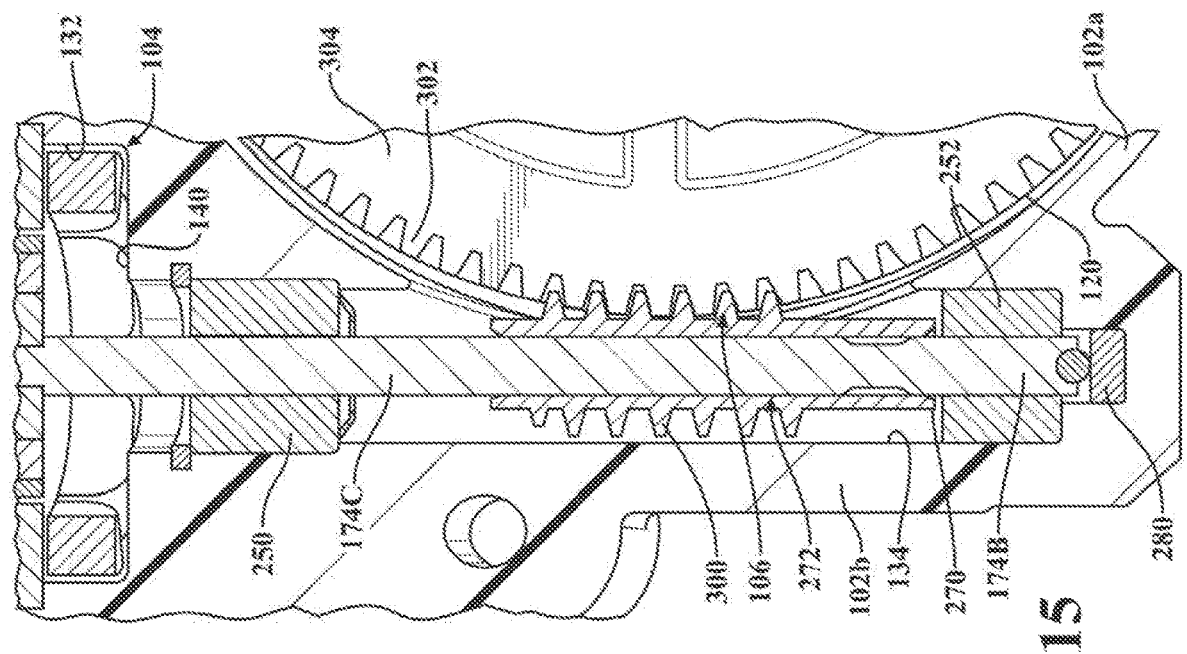
Figure 16:
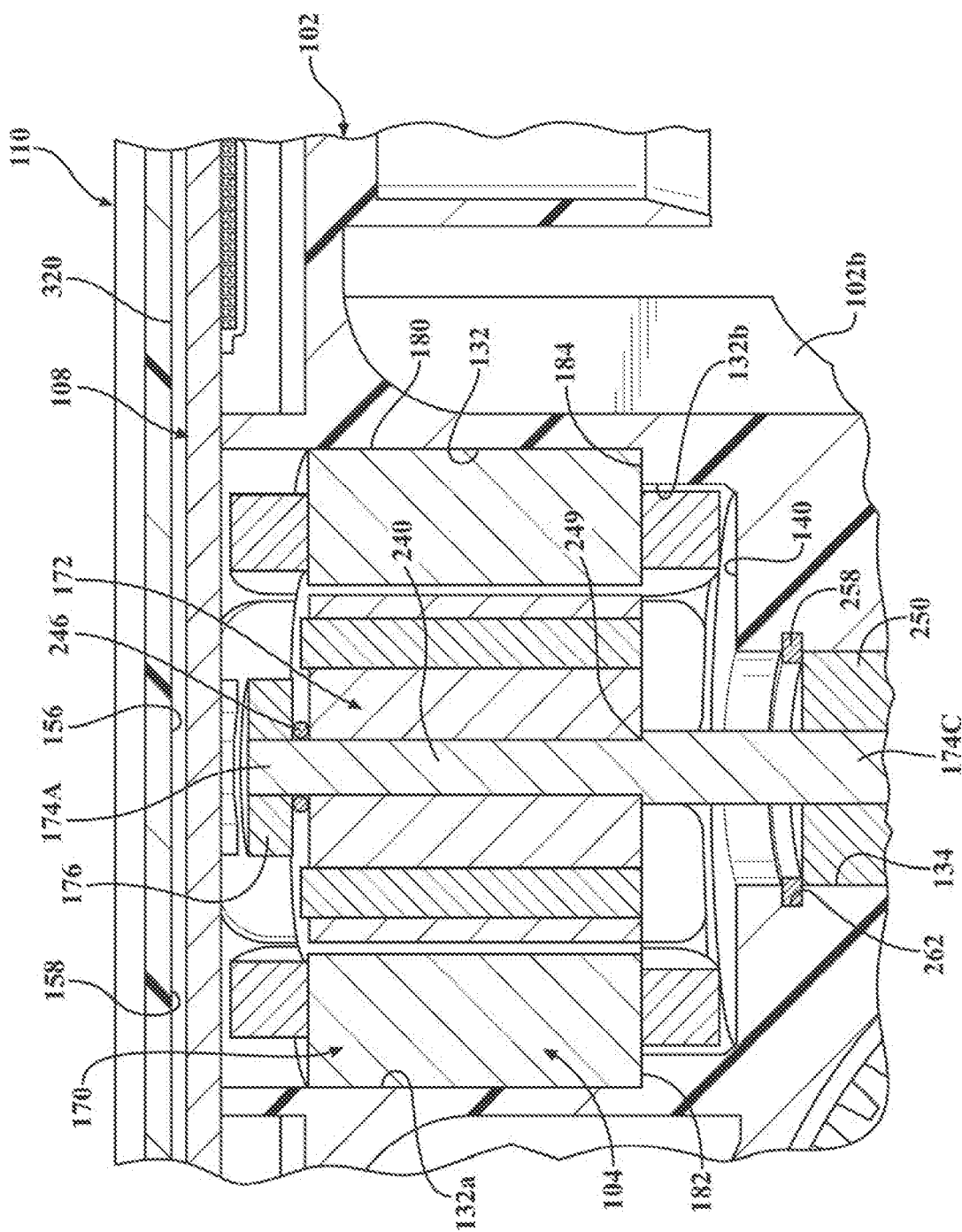
Figure 17:
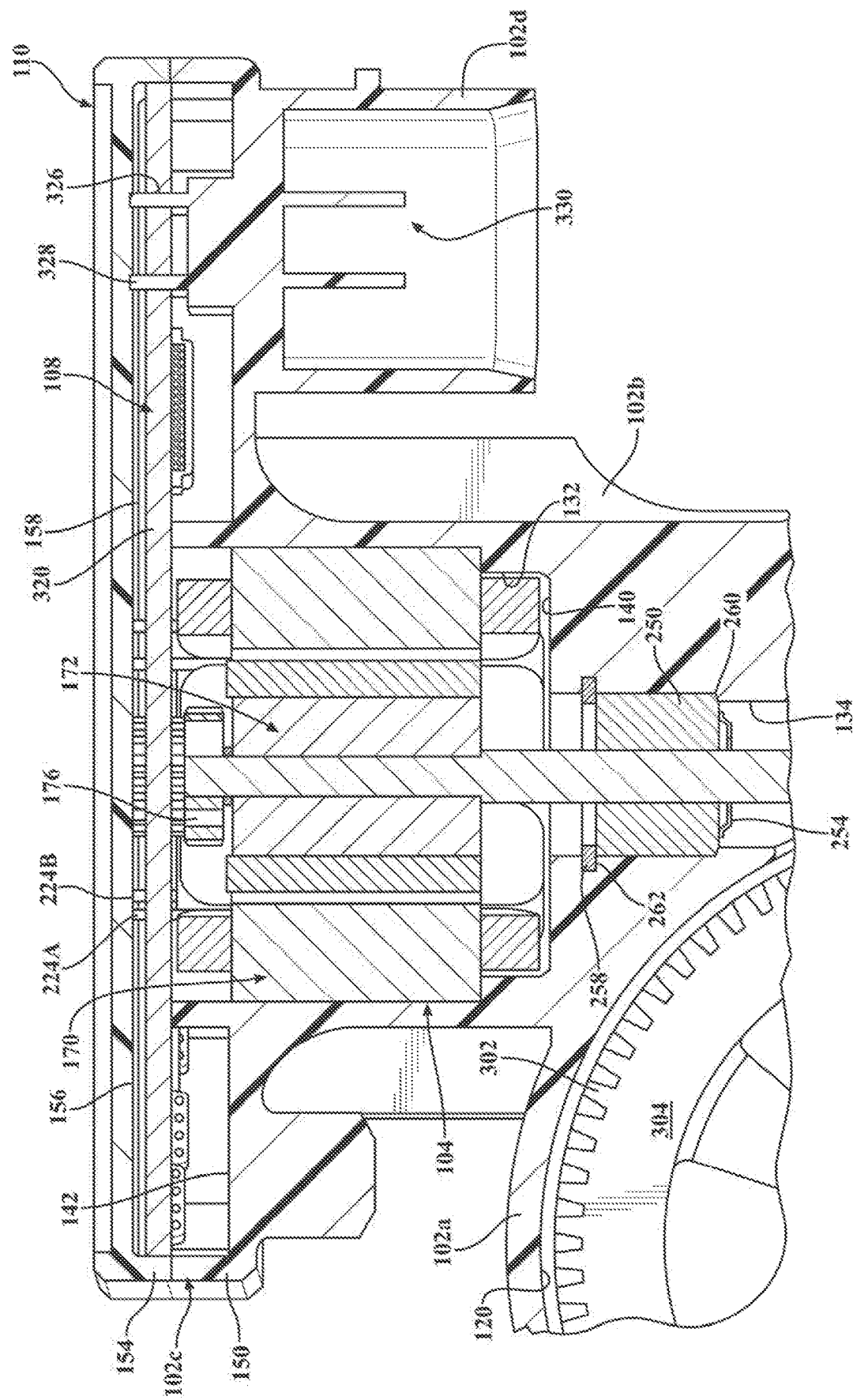
Figure 18:
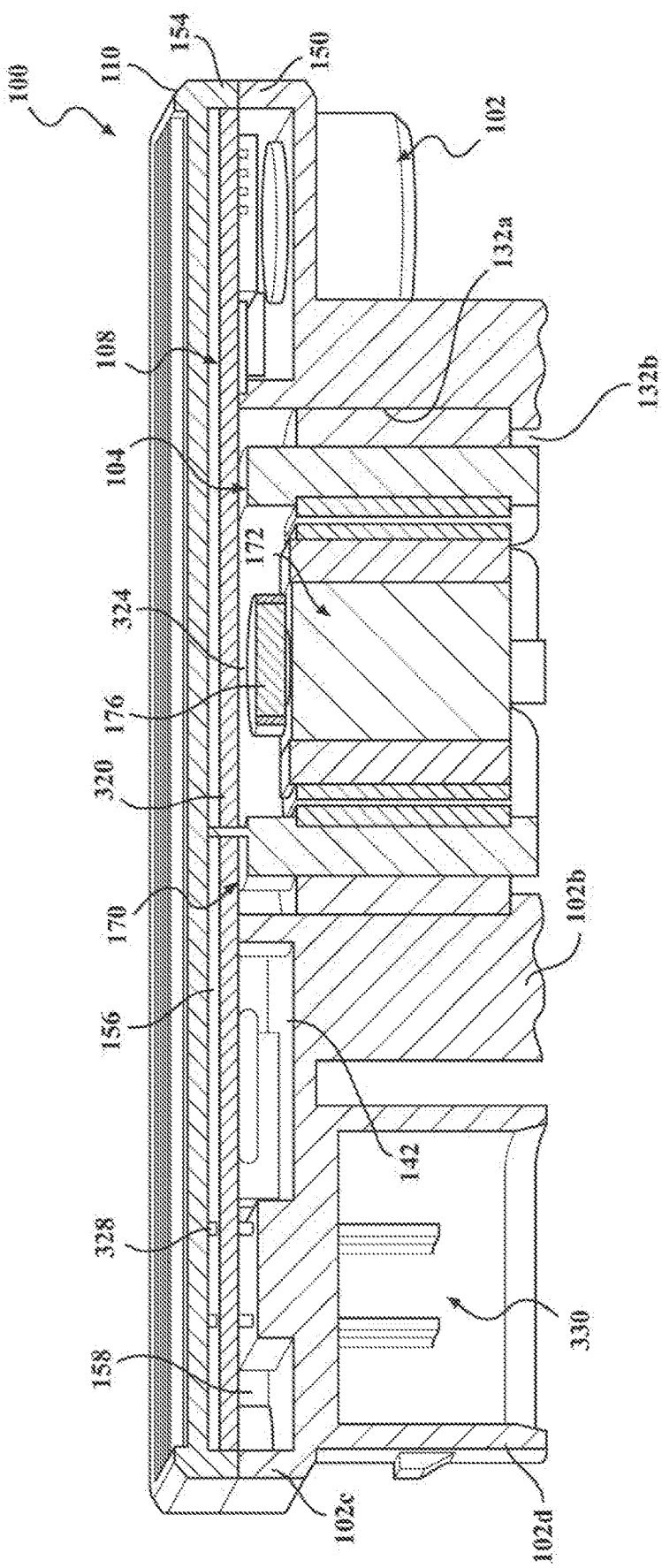
Figure 19:
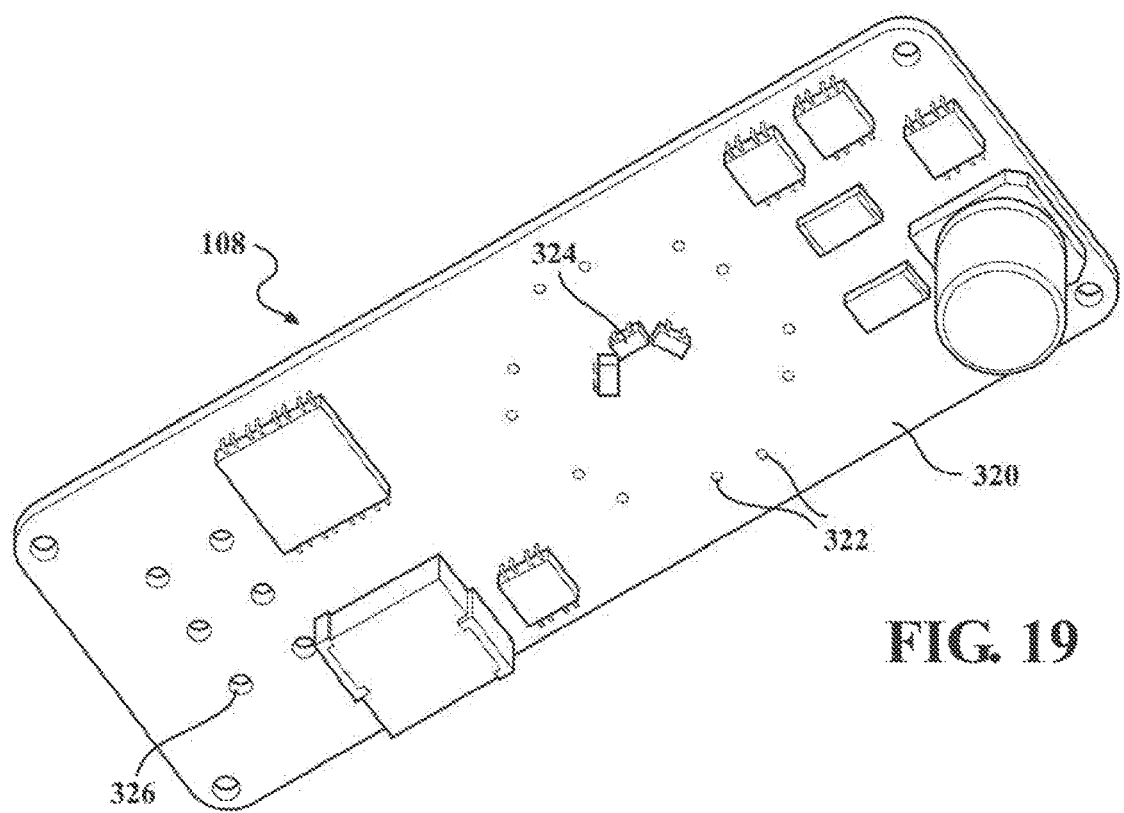
Figure 20:
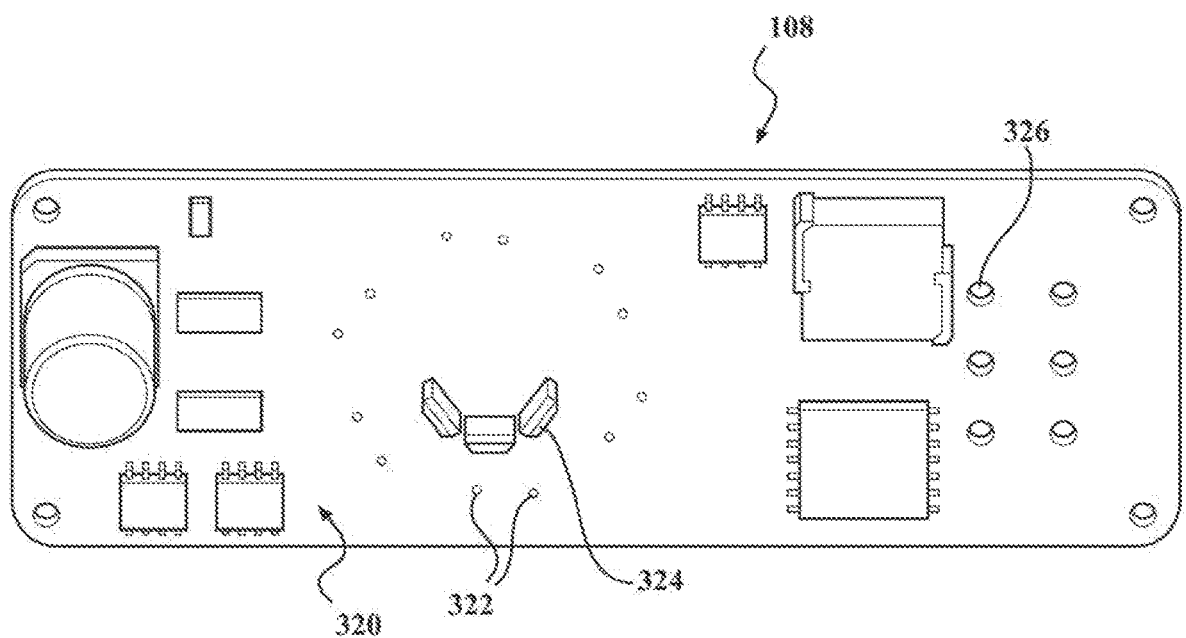
Figure 21B:
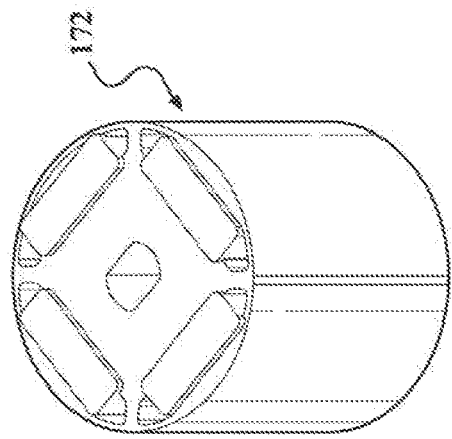
Figure 21E:
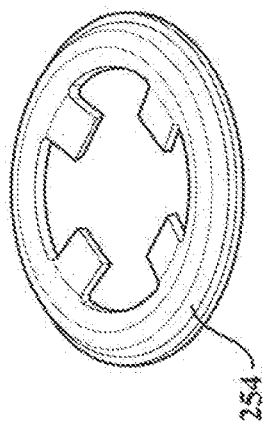
Figure 21D:
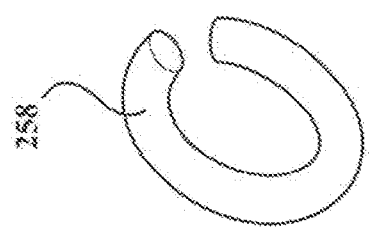
Figure 21A:
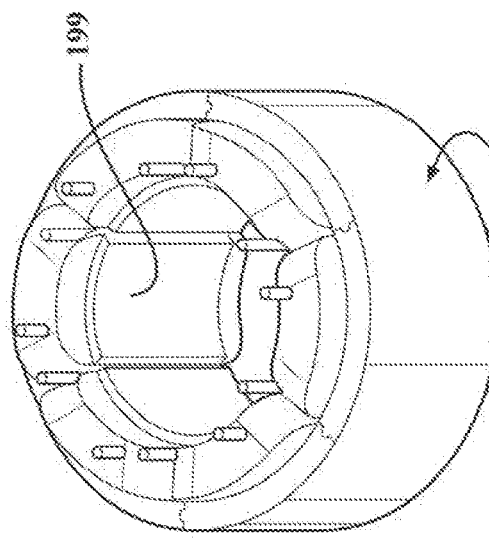
Figure 21C:
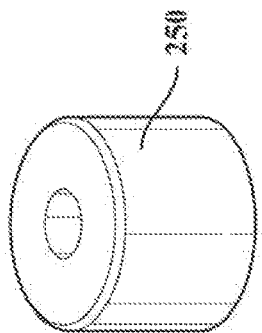
Figure 22A:
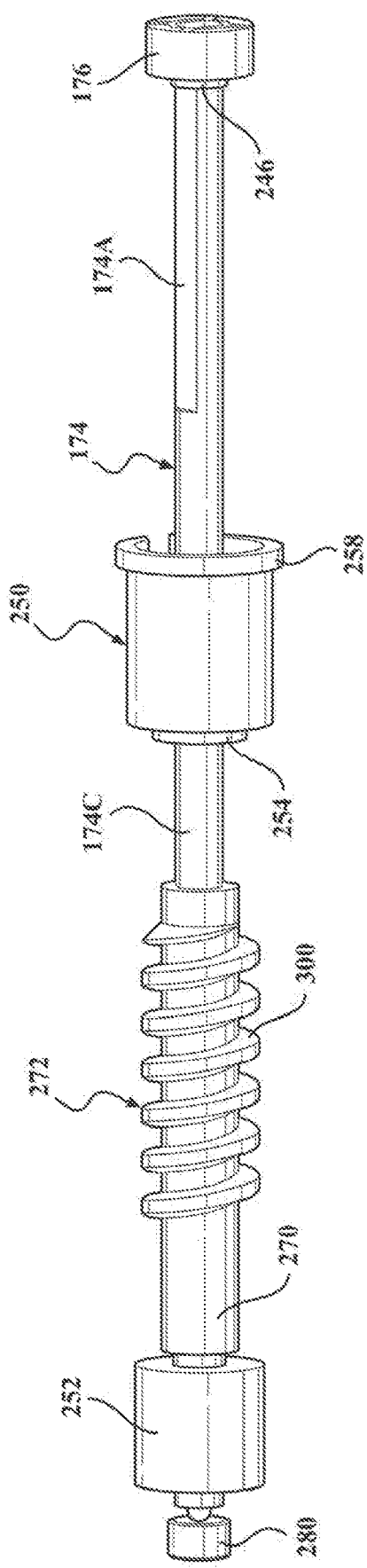
Figure 22C:
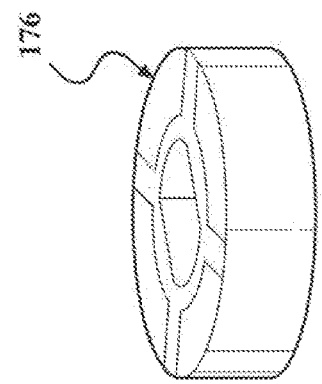
Figure 22B:
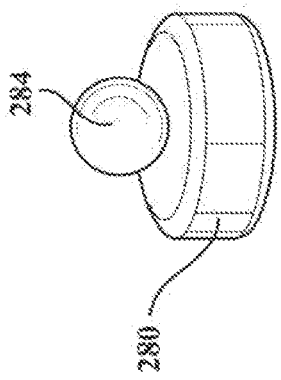
Figure 30:
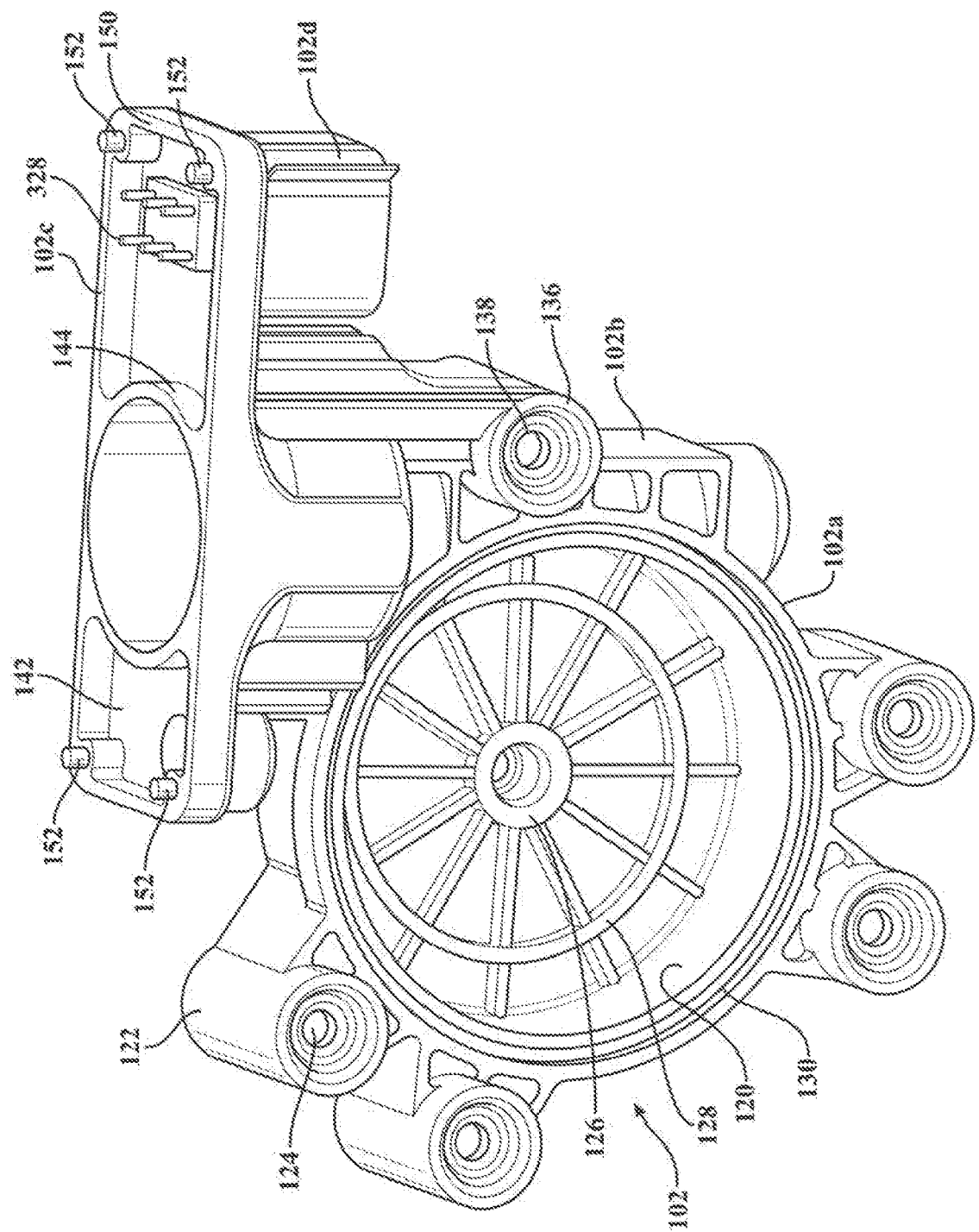
Figure 31:
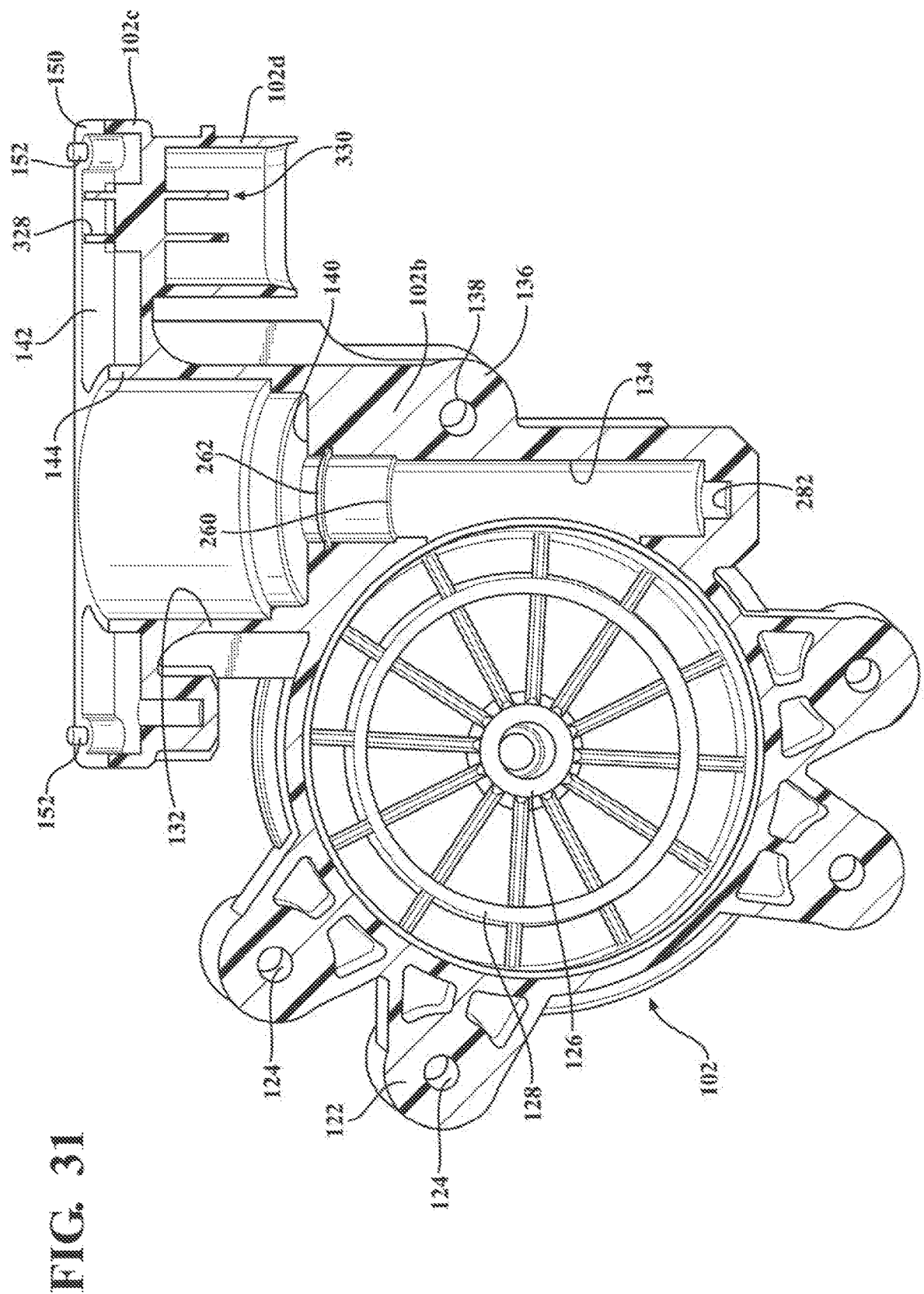
Figure 32:
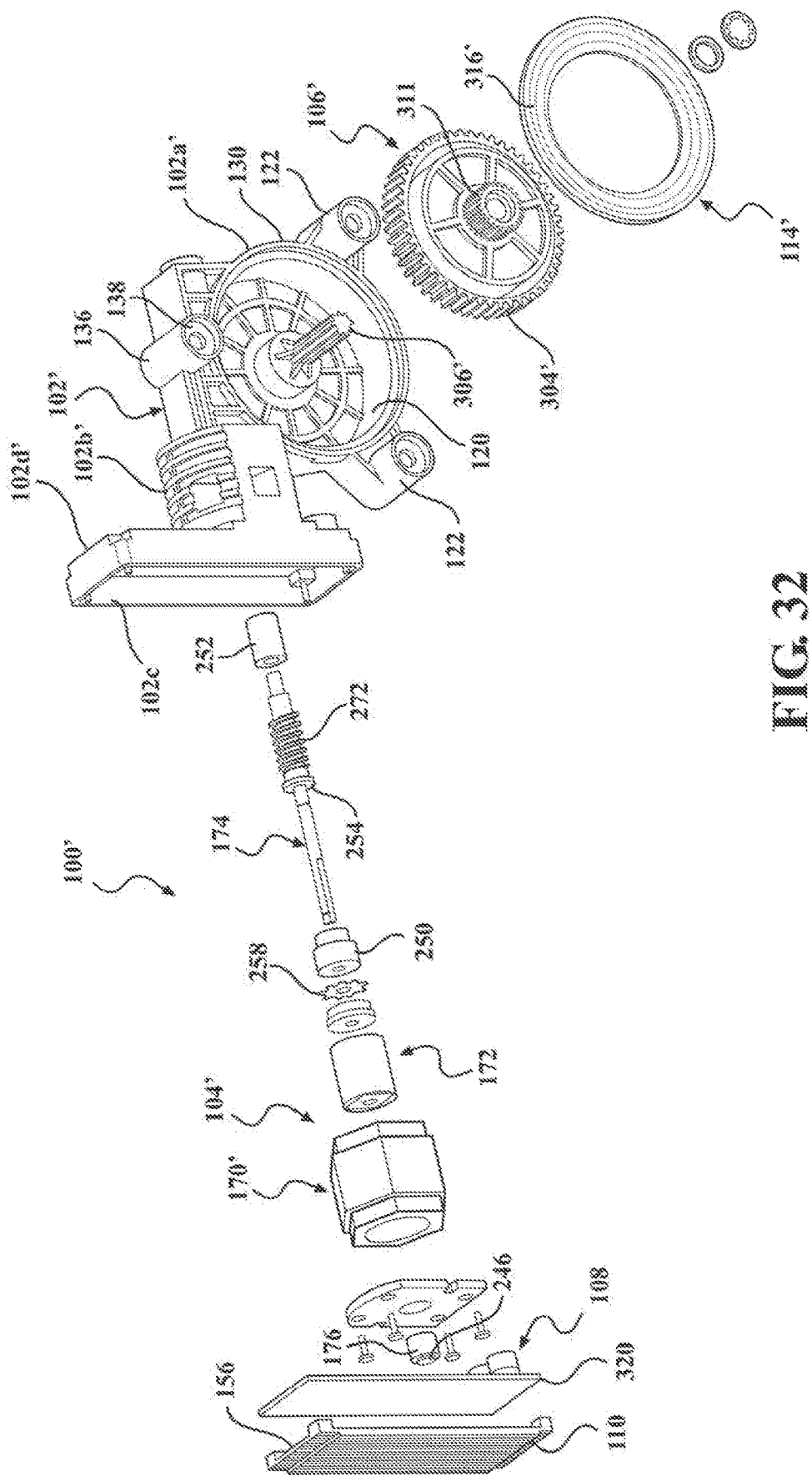

FIGS. 6 and 7 are pictorial front and back views of a powered actuator unit constructed in accordance with a first embodiment of the present disclosure and which is adapted for use with the dual rail cable-driven window regulator shown in FIGS. 2 and 3 in substitution for the prior art powered actuator unit of FIGS. 4 and 5;

FIGS. 8 and 9 are respectively similar to FIGS. 6 and 7 except illustrating certain portions of the housing transparently to better illustrate various internal components;

FIGS. 10 and 11 are vertical sectional views taken respectively through FIGS. 6 and 7 and which illustrate the powered actuator unit of the first embodiment of the present disclosure to include an actuator housing configured to enclose a brushless DC (BLDC) electric motor assembly, a support arrangement, a gear drive mechanism, and a controller arrangement;

FIGS. 12 and 13 are exploded views of the powered actuator unit of the first embodiment of the present disclosure;

FIGS. 14 and 15 are partial sectional views illustrating portions of the support arrangement and the gear drive mechanism of FIGS. 10 and 11;

FIGS. 16 through 18 are partial sectional views illustrating portions of the BLDC electric motor assembly and the controller arrangement of FIGS. 10 and 11;

FIGS. 19 and 20 illustrate a circuit board associated with the controller arrangement of FIGS. 10 and 11;

FIGS. 21A through 21F illustrate parts of the BLDC electric motor assembly of the first embodiment of the present disclosure;

FIGS. 22A through 22C illustrate the motor shaft, worm and support arrangement installed in the powered actuator unit;

FIGS. 23 through 25 are directed to a rotor unit associated with the BLDC electric motor assembly;

FIGS. 26 through 29 are directed to a stator unit associated with the BLDC electric motor assembly of the first embodiment of the present disclosure;

FIGS. 30 and 31 are directed to the actuator housing associated with the powered actuator unit of the present disclosure;

FIGS. 32 and 33 are exploded views of the powered actuator unit of a second embodiment of the present disclosure; and FIGS. 34 through 37 are directed to carriers of electromagnetic sub-assemblies of a stator unit associated with a BLDC electric motor assembly of the second embodiment of the present disclosure.

Corresponding reference numbers indicate correspondent components throughout the several views of the drawings.

DETAILED DESCRIPTION

Example embodiments will now be described more fully with reference to the accompanying drawings. In general, a powered actuator unit will be disclosed that is considered to be adaptable, with or without modifications, for use as part of a power-operated closure system of the type installed in motor vehicles to move a moveable closure member through a range of motion between a first position and a second position. More specifically, the powered actuator unit will be disclosed to incorporate a brushless DC (BLDC) electric motor assembly, a support arrangement, a gear drive mechanism, and a controller arrangement into a common housing. To this end, an example embodiment of a powered actuator unit integrated into a power window lift system will be described. However, the present disclosure is not limited to use with any particular type of window regulator described nor is it limited to window lift systems. Specifically, the example embodiments are provided so that this disclosure will be thorough, and will fully convey its intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
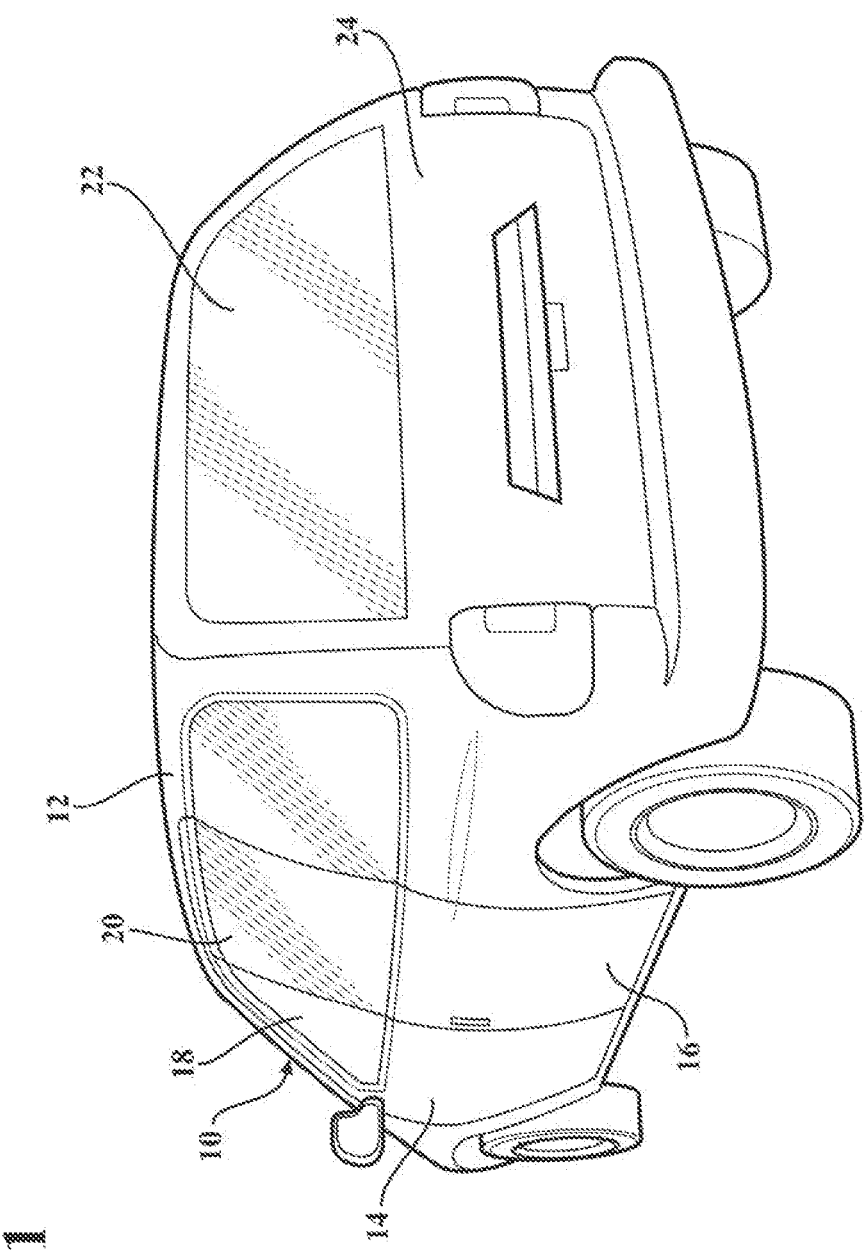
FIG. 1 is a perspective view of a motor vehicle equipped with one or more power-operated closure systems.

Referring initially to FIG. 1 of the drawings, an example of a motor vehicle 10 is shown having a vehicle body 12, a hinged front door 14 and a sliding rear door 16. Front door 14 is equipped with a window 18 which is moveable between closed and open positions via a power-operated window lift system. Similarly, rear door 16 is equipped with a window 20 which is moveable between closed and open positions via a power-operated window lift system. While the present disclosure will hereinafter be specifically directed to describing the window lift system associated with rear sliding door 16, those skilled in the art will recognize and appreciate that similar arrangements to that described herein can be adapted for use with front door 14 and/or a window 22 associated with a hinged liftgate 24.

Referring now to FIGS. 2 and 3, a door panel 28 associated with sliding door 16 is disclosed, as is a door module 30 adapted to be mounted to door panel 28. Door module 30 includes a carrier 44 that supports multiple door hardware components 47 such as, for example, a power-operated cinch latch 46, a power-operated door latch 50, and a power-operated window lift system including a window regulator mechanism 53 and a powered actuator unit 52. Cinch latch 46 is mounted to carrier 44 via a presenter 48 while door latch 50 is also mounted to carrier 44 via another presenter 51. Window regulator mechanism 53 is shown, in this non-limiting example, to include a pair of laterally-spaced guide rails 54a and 54b as well as a corresponding pair of window lifter plates 56a and 56b. Window 20 is adapted to be mounted to lifter plates 56a and 56b for bi-directional translational movement along guide rails 54a, 54b. A cable-pulley type of lift mechanism (not shown) is provided for interconnecting lifter plates 56a, 56b to power actuator unit 52. FIGS. 2 and 3 illustrate lifter plates 56a, 52b positioned along an upper end of guide rails 54a, 54b so as to locate window 20 in its closed position. As will be noted, lifter plates 56a, 56b are shown in phantom in FIG. 3 to also be capable of being located along a lower end of guide rails 54a, 54b so as to locate window 20 in its open position.

FIGS. 4 and 5 illustrate powered actuator unit 52 constructed in accordance with a conventional arrangement and including a drive housing 60 and an electric motor assembly 62. Drive housing 60 defines a gear chamber 64, a motor shaft chamber 66 communicating with gear chamber 64, and a motor mounting chamber 68 communicating with shaft chamber 66. A mounting flange 70 formed on housing 60 surrounds motor mounting chamber 68 and is configured to mate with a motor mount flange 72 associated with a motor housing 74 of electric motor assembly 62. Fasteners 76 are used to secure motor housing 74 to housing mounting flange 70, whereby a rotary motor shaft 78 is disposed in motor shaft chamber 66. A worm 80 fixed to motor shaft 78 is meshed with a large gear (not shown) that is rotatably disposed in gear chamber 64. Rotation of the large gear controls rotation of a drum associated with the cable-pulley drive mechanism. A conventional brushed DC motor is mounted in motor housing 74 and is operable to control the amount and direction of rotation of motor shaft 78. Housing 60 includes several apertured mounting lugs for securing powered actuator unit 52 to carrier 44. Control signals provided from a remotely-located controller unit (not shown) are supplied to powered actuator unit 52 via a wiring harness having one end secured in a plug in electrical connector 84 extending from motor housing 74.

With particular reference now to FIGS. 6 through 31, a first embodiment of an integrated powered actuator unit 100 will now be described and which is operably configured to replace powered actuator unit 52 within the window lift system and provide the advantages and benefits hereinafter detailed. The term "integrated" is used since actuator unit 100 is configured to incorporate a set of functional components and/or sub-assemblies into a common device. While detailed hereinafter with greater specificity, the functional components/sub-assemblies generally include an actuator housing 102, a brushless DC (BLDC) electric motor assembly 104, a geared reduction unit 106, a controller arrangement 108, a controller cover plate 110, a support arrangement 112, and a gear cover plate 114.

Actuator housing 102 is preferably a molded one-piece non-metallic (i.e., plastic) component generally configured to define a gearing section 102a, a motor section 102b, a controller section 102c, and a connector section 102d. Gearing section 102a is generally cylindrical in configuration and includes a gear chamber 120 and a plurality (four shown) of mounting lugs 122 having apertures 124 each adapted to receive a fastener (not shown) for securing actuator housing 102 to carrier 44. As best seen in FIGS. 13 and 30, gear chamber 120 includes a central hub 126, a circular support ring flange 128, and an annular end groove 130. Motor section 102b is integrally formed with gearing section 102a and includes a first or larger diameter motor chamber 132 and a second or smaller diameter shaft chamber 134. Another mounting lug 136 is provided on motor section 102b and has an aperture 138 sized to receive a fastener to assist in securing actuator housing 102 to carrier 44. Motor chamber 132 and shaft chamber 134 are aligned along a common center axis and are delineated by a bottom surface 140 of motor chamber 132. As best seen from FIGS. 30 and 31, motor chamber 132 extends into controller section 102c of actuator housing 102 and is delineated from a controller chamber 142 by a raised annular lip flange 144.

Controller section 102c of actuator housing 102 includes a peripheral edge flange 150 from which four connector lugs 152 extend. Lug apertures (not shown) are formed in a mating peripheral edge flange 154 of controller cover plate 110 so as to facilitate mounting of controller cover plate 110 to controller section 102c of actuator housing 102. Upon installation, a cover chamber 156 formed in controller cover plate 110 cooperates with controller chamber 142 in controller section 102c to define an enclosure chamber 158 within which controller arrangement 108 is operably disposed.

Electric motor assembly 104 is shown to generally include a stator unit 170, a rotor unit 172, a motor shaft 174, and a position sensor 176. Stator unit 170 is configured to be non-rotatably (i.e., stationary) mounted in motor chamber 132. As best seen in FIG. 16, an outer peripheral surface 180 of stator unit 170 is in press-fit engagement with the inner wall surface of motor chamber 132 while a bottom surface 182 of stator unit 170 rests against a shoulder surface 184 formed in motor chamber 132. Thus, motor chamber 132 is formed to include a stepped configuration having a larger portion 132a and a smaller portion 132b.

Figure 26:
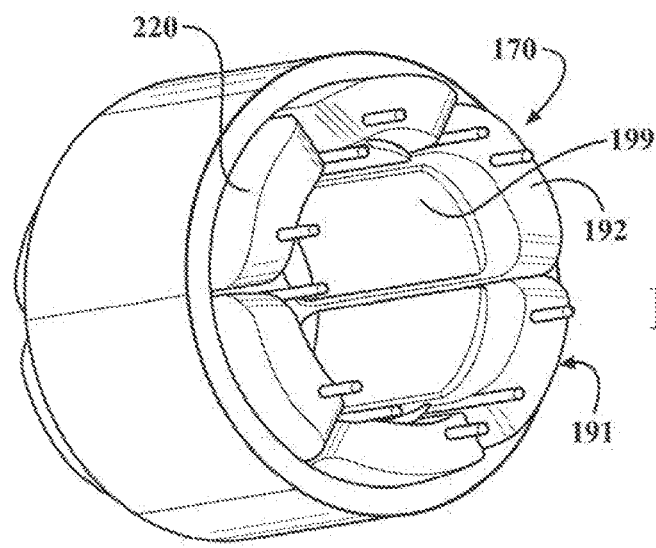
Figure 27:
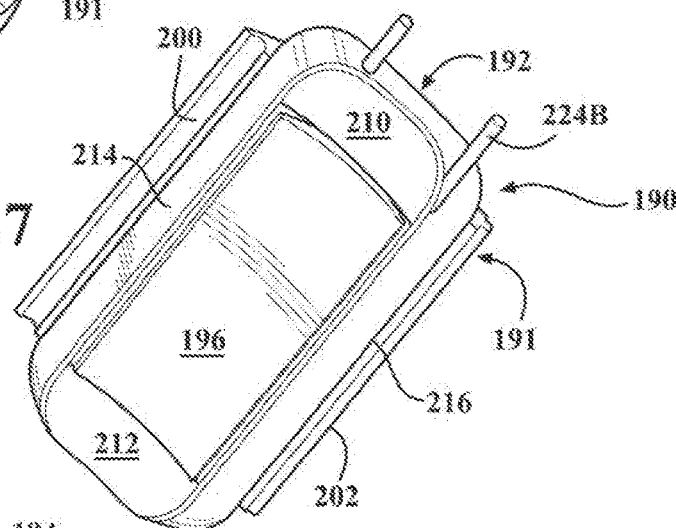
Figure 28:
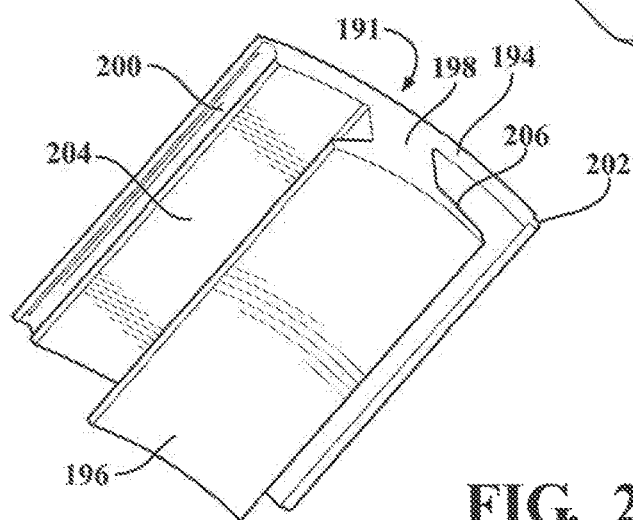
Figure 29:
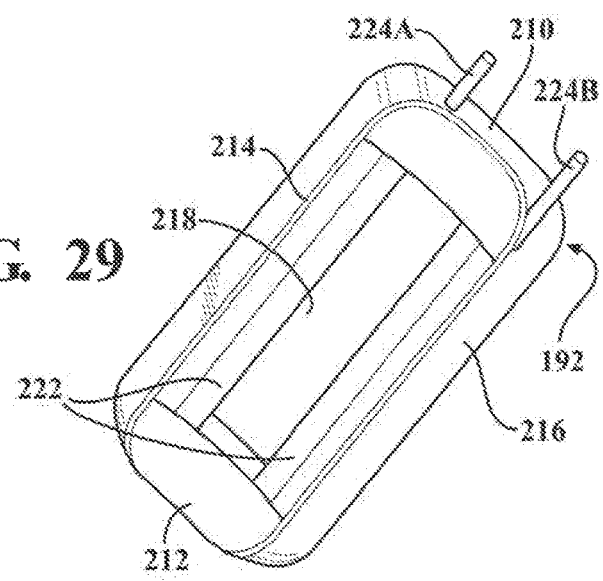

As best seen from FIGS. 26-29, stator unit 170 is configured, in this non-limiting example, to include a plurality of pre-assembled electromagnetic sub-assemblies 190. FIG. 27 illustrates one of sub-assembly 190 while FIG. 26 illustrates a plurality of six (6) such sub-assemblies 190 interconnected to define stator unit 170. Each sub-assembly 190 includes a carrier 191 and a winding unit 192. The winding unit 192 can be a coil winding or one-piece bus bar, for example. Carrier 191 includes an arcuate outer ring segment 194, an arcuate inner ring segment 196, and a web segment 198 interconnecting the outer and inner ring segments. Outer ring segment 194 includes a first edge profile defining a female connector 200 and an opposite, second edge profile defining a male connector 202. As best seen in FIG. 26, upon assembly of the plurality of sub-assemblies 190 into stator unit 170, a male connector on one sub-assembly 190 is retained in a female connector of an adjacent sub-assembly 190. Once assembled, the inner ring segments 196 define a rotor cavity 199 of the stator unit 170 that has a circular cross-section. Obviously, the specific number of sub-assemblies 190 associated with stator unit 170, as well as the type of connectors used can be selected based on a particular application.

Referring still primarily to FIGS. 26-29, the winding unit 192 or bus bar is fabricated, in this non-limiting example, as an electrically conductive component and is configured to surround and be retained on web segment 198 of carrier 191 between an inner surface 204 of outer ring segment 194 and an outer surface 206 of inner ring segment 196. Winding unit 192 is configured to include an upper rail segment 210 and a lower rail segment 212 interconnected by a pair of laterally-spaced leg segments 214, 216 so as to define a generally rectangular aperture 218. Winding unit 192 defines a continuous outer surface 220 that is arcuately configured such that leg segments 214, 216 engage inner surface 204 of outer ring segment 194. Likewise, legs 214, 216 of winding unit 192 define an inner surface 222 configured to engage outer surface 206 of inner ring segment 196. As seen, upon assembly of winding unit 192 to carrier 191, upper rail segment 210 and lower rail segment 212 extend axially and outwardly from carrier 191. A pair of electrical terminal pins 224A, 224B extend from upper rail segment 210 of each winding unit 192.

Referring primarily to FIGS. 23-25, rotor unit 172 is generally shown to include a cylindrical back iron component, hereinafter referred to as rotor 230, and a plurality of permanent magnets 232 retained in elongated, open-ended retention slots 234 formed in rotor 230. In the non-limiting example shown, a plurality of four (4) magnets 232 are equally-spaced and retained in slots 234. Rotor 230 is further shown to include a non-circular drive aperture 236 extending through its center axis. As will be detailed, rotor unit 172 is disposed within rotor cavity 199 of stator unit 170 and is configured to rotate relative to stator unit 170 in response to electrical energy being supplied to winding units 192.

Motor shaft 174 is shown to include a first end segment 174A, a second end segment 174B, and an intermediate segment 174C. First end segment 174A is formed with a non-circular drive lug profile 240 configured to mate with non-circular drive aperture 236 in rotor 230 such that rotation of rotor unit 172 results in concurrent rotation of motor shaft 174. In addition, position sensor 176 (i.e., a Hall Effect device) has a non-circular drive aperture 244 configured to also mate with drive lug 240. As seen in FIGS. 16 and 17, position sensor 176 is located above rotor unit 172 and retained on first end segment 174A of motor shaft 174 via a snap ring 246 located in a retention groove 248. As is also seen, a bottom surface of rotor 230 rests on a shoulder 249 formed at the interface between first end segment 174A and intermediate segment 174C of motor shaft to positively axially position rotor unit 172 on shaft 174, with snap ring 246 inhibiting axial travel. First end segment 174A of motor shaft 174 is completely located within motor chamber 132 while intermediate segment 174C and second end segment 174B of motor shaft 174 are located in shaft chamber 134.

Motor shaft 174 is rotatably supported in shaft chamber 134 of actuator housing 102 via support arrangement 112. Support arrangement 112 is shown to include a pair of laterally-spaced bushings 250 and 252. Bushing 250 is pre-assembled onto intermediate segment 174C of motor shaft 174 and is axially retained between a locator ring 254 positioned in a retention groove 256 formed in motor shaft 174 and a snap ring 258. Upon assembly of motor shaft 174 into shaft chamber 134, a bottom portion of bushing 250 engages a shoulder surface 260 formed in shaft chamber 134 and snap ring 258 is positioned in a groove 262 formed in motor section 102b of actuator housing 102 so as to positively locate and axially retain bushing 250.

Bushing 252 surrounds second end segment 174B of motor shaft and abuts an end segment 270 of a first gear, such as worm 272, fixed to motor shaft 172 and which is part of gear drive mechanism 106. FIG. 14 shows bushing 252 abutting a terminal end surface 274 of shaft chamber 134. A semi-circular aperture 276 is formed in terminal end 278 of motor shaft 174. Support arrangement 112 further includes an end support bushing 280 that is retained in a reduced diameter segment 282 of shaft chamber 134, and a ball bearing 284 that is positioned within aperture 276 so as to provide a "centering" function upon rotation of motor shaft 174. Bushings 250 and 252 are non-rotatable relative to motor section 102b of actuator housing 102 and each have a central throughbore configured to rotatably support motor shaft 174.

Geared drive unit 106 is shown to include worm 272 having threads 300 meshed with teeth 302 of a drive gear 304 that is rotatably supported in gear chamber 120 of gearing section 102a in actuator housing 102. A drive draft 306 is fixed to drive gear 304 and has a first end segment 308 rotatably disposed in apertured hub 126 while a second end segment 310 extends outwardly through a central aperture 312 formed in gear cover plate 114. Second end segment 310 is configured to be coupled to a rotary component (i.e., a drive drum) of the window lift regulator so as to control movement of window 20 in response to rotation of drive gear 304. Gear cover plate 114 includes an outer peripheral rim segment 316 configured to be retained within groove 130 formed in gearing section 102a of actuator housing 102, thereby enclosing drive gear 304.

Controller arrangement 108 is shown to generally include a printed circuit board (PCB) 320 disposed within enclosure chamber 158 upon installation of enclosure cover plate 110 onto enclosure section 102c of actuator housing 102. As best shown in FIGS. 19 and 20, PCB 320 is shown to include a plurality of terminal ports 322 arranged and configured to receive terminal pins 224A, 224B from each sub-assembly 190. PCB 320 further includes various electrical or electronic components for controlling operation of powered actuator unit 100. One such component is shown by reference numeral 324 and is a sensor unit arranged to cooperate with position sensor 176 to detect the rotated position sensor 176 to detect the rotated position of motor shaft 174. In the embodiment shown, sensor 324 is aligned with the rotary axis of motor shaft 174. While PCB 320 is shown located perpendicular to shaft 174, other arrangements are contemplated, such as PCB 320 be arranged parallel to motor shaft 174 such that sensor 324 is configured to detect a position sensor 176 on the outer surface of shaft 174. Connector ports 326 are also formed in PCB 320 and are configured and arranged to receive connector terminals 328 associated with a plug-in electrical connector 330 provided in connector section 102d of housing 102. As is also illustrated, PCB 320 includes a plurality of mounting apertures 330 located to accept insertion of mounting posts 152 which extend outwardly from enclosure section 102c of actuator housing 102 so as to permit simple assembly of PCB 320 therein prior to installation of enclosure cover plate 110.

The detailed description provided above is intended to permit those skilled in the art to understand the various features and related advantages associated with powered actuator unit 100. For example, actuator unit 100 is configured such that bushings 250, 252 are disposed on opposite sides of the mechanical load (i.e., meshed engagement of worm 272 and drive gear 304 versus the conventional "cantilevered" loading arrangements or three bushing (or bearings) configurations. Additionally, actuator unit 100 facilitates locating stator unit 170, rotor unit 172, motor shaft 174 and bushings 250, 252 in a one-piece actuator housing 102. Motor assembly 104 can be installed as a pre-assembled device to facilitate improved assembly. Bushing 252 and end mount bushing 280 can be pre-installed in shaft chamber 134. As an option, bushing 252 can be installed via gear chamber 120 or, alternatively, via an endcap that can be provided at a terminal end of shaft portion of motor housing section 102b to facilitate such installation. Furthermore, one of move of bushings 250, 252 could be integrally formed in actuator housing 102. Furthermore, bushings 250, 252 could be replaced with ball bearing units. Regardless of the arrangement of bushings 250, 252, first end 174A of motor shaft 174 is considered to be "free" floating since it is not mechanically contained/restrained by a separate bushing. The lateral spacing of bushings 250, 252 allows first end 174A of motor shaft 174 (and rotor unit 172) to be self-centering relative to stator unit 170. This free floating (i.e. non-constrained) arrangement of first end 174A of motor shaft 174 is best shown in FIGS. 10, 11 and 16-18. This feature permits the "loaded" segment of motor shaft 174 (i.e. intermediate segment 174C with worm 272) to be mechanically constrained while eliminating the need to provide an end bushing in association with first end 174A of motor shaft 174. Finally, integration of the components of electric motor assembly 104 directly into actuator housing 102 eliminates the need for a "can-type" stand-alone motor assembly of the type used in conventional systems, thereby reducing cost and weight of actuator unit 100.

BLDC electric motor assembly 104 is an improvement over conventional electric motors used in vehicular closure systems since it provides reduced packaging requirements, reduced loading requirements on the supported motor shaft and the advantages of no commutations, reduced friction, more efficiency, higher speed and higher power density.

With reference to FIGS. 32 through 34, a second embodiment of an integrated powered actuator unit 100' is also disclosed. As with actuator unit 100 described above, the actuator unit 100' is operably configured to replace powered actuator unit 52 within the window lift system and provide the advantages and benefits detailed herein. The actuator unit 100' includes an actuator housing 102', a brushless DC (BLDC) electric motor assembly 104', a geared reduction unit 106', a controller arrangement 108, a controller cover plate 110, and a gear cover plate 114'.

Actuator housing 102' is generally configured to define a gearing section 102a', a motor section 102b', a controller section 102c, and a connector section 102d'. Gearing section 102a' is generally cylindrical in configuration and includes a gear chamber 120 and a plurality of mounting lugs 122 having apertures 124 each adapted to receive a fastener (not shown) for securing actuator housing 102' to carrier 44. As best seen in FIGS. 32 and 33, gear chamber 120 includes an annular end groove 130. Motor section 102b' is integrally formed with gearing section 102a' and can define at least one cooling opening 135 extending into motor chamber 132 for cooling the motor assembly 104' (FIG. 33). However, it should be appreciated that the motor section 102b' may not include cooling openings 135 (FIG. 32).

Geared drive unit 106' is shown to include worm 272 having threads that mesh with teeth of a drive gear 304' that is rotatably supported in gear chamber 120 of gearing section 102a' in actuator housing 102'. Unlike the drive shaft 306 fixed to drive gear 304 described for the first embodiment of the integrated powered actuator unit 100 above, the drive shaft 306' is fixed to the actuator housing 102' and adapted to allow drive gear 304' to rotate thereabout within the gear chamber 120 (FIGS. 32 and 33). An output gear 311 is coupled to or integrated with drive gear 304' to couple to the rotary component of the window lift regulator, so as to control movement of window 20 in response to rotation of drive gear 304'. Gear cover plate 114' includes an outer peripheral rim segment 316' configured to be retained within groove 130 formed in gearing section 102a' of actuator housing 102', thereby enclosing drive gear 304'.

Electric motor assembly 104' is shown to generally include a stator unit 170', a rotor unit 172, a motor shaft 174, and a position sensor 176. Stator unit 170' is configured to be non-rotatably (i.e., stationary) mounted in motor chamber 132. An outer peripheral surface 180 of stator unit 170' is in press-fit engagement with the inner wall surface of motor chamber 132'.

The stator unit 170' is configured, in this non-limiting example, to include a plurality of electromagnetic sub-assemblies 190'. The plurality of electromagnetic sub-assemblies 190' abut or interconnect with one another to define the stator unit 170'. Each of the plurality of electromagnetic sub-assemblies 190' includes a carrier 191' and a winding unit (e.g., similar to winding unit 192 described above). The winding unit can be configured to surround and be retained on web segment 198' of carrier 191' between an inner surface 204' of outer ring segment 194' and an outer surface 206' of inner ring segment 196'. Unlike carrier 191 described above, the carrier 191' includes an outer ring segment 194' that is planar (i.e., has a linear cross-section viewed longitudinally and a linear cross-section viewed laterally) and an inner ring segment 196' that is arcuate (i.e., has a linear cross-section viewed longitudinally and a curvilinear cross-section viewed laterally) and a web segment 198' interconnecting the outer ring segment 194' and the inner ring segment 196'. In more detail, the plurality of electromagnetic sub-assemblies 190' are each adapted to abut one another in an annular arrangement, upon assembly.

Figure 35:
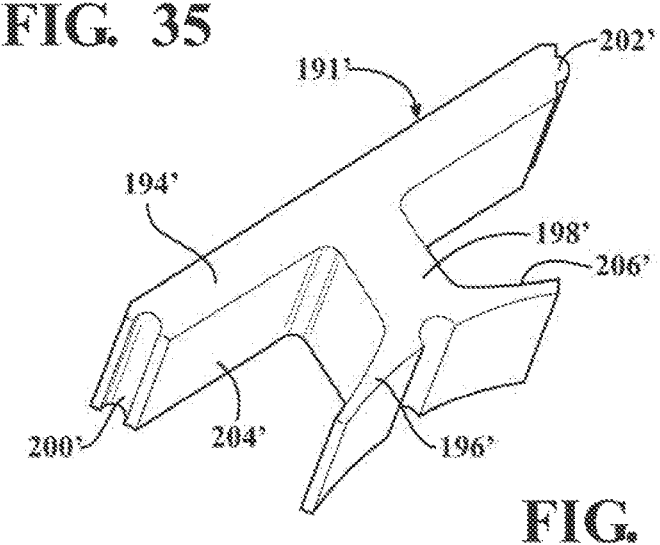

As best shown in FIGS. 34 and 35, the abutting outer ring segments 194' define the outer peripheral surface 180' of the stator unit 170' that has a polygonal cross-section. The inner ring segments 196' define a rotor cavity 199' of the stator unit 170' that has a circular cross-section. Preferably there are six electromagnetic sub-assemblies 190' arranged to form the outer peripheral surface 180' that has a hexagonal cross-section, however, it should be appreciated that the outer peripheral surface 180' may take various forms and have any polygonal cross-section. Because outer peripheral surface 180' has a polygonal cross-section, motor chamber 132' of actuator housing 102' can be shaped to contour and engage the outer peripheral surface 180' of the stator unit 170' to secure the stator 170' in place and provide an anti-rotation function.

In order to couple the carriers 191' of the plurality of electromagnetic sub-assemblies 190', the outer ring segments 194' each include a first edge profile defining a female connector 200'. Similarly, each outer ring segment 194' also includes a second edge profile opposite the first edge profile that defines a male connector 202' for coupling with the female connector 200' of another carrier 191' upon assembly of the plurality of electromagnetic sub-assemblies 190'. Obviously, the specific number of sub-assemblies 190' associated with stator unit 170', as well as the type of connectors used can be selected based on a particular application.

Figure 37:
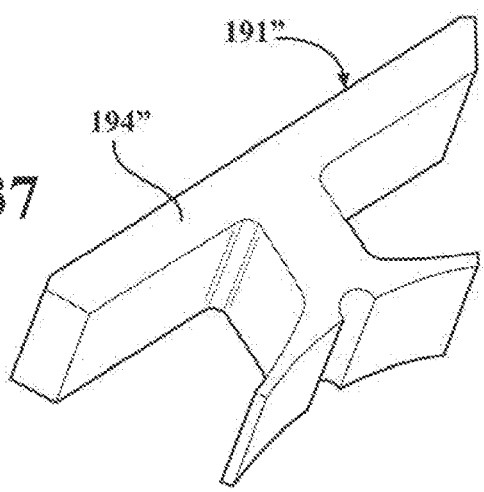
Figure 36:
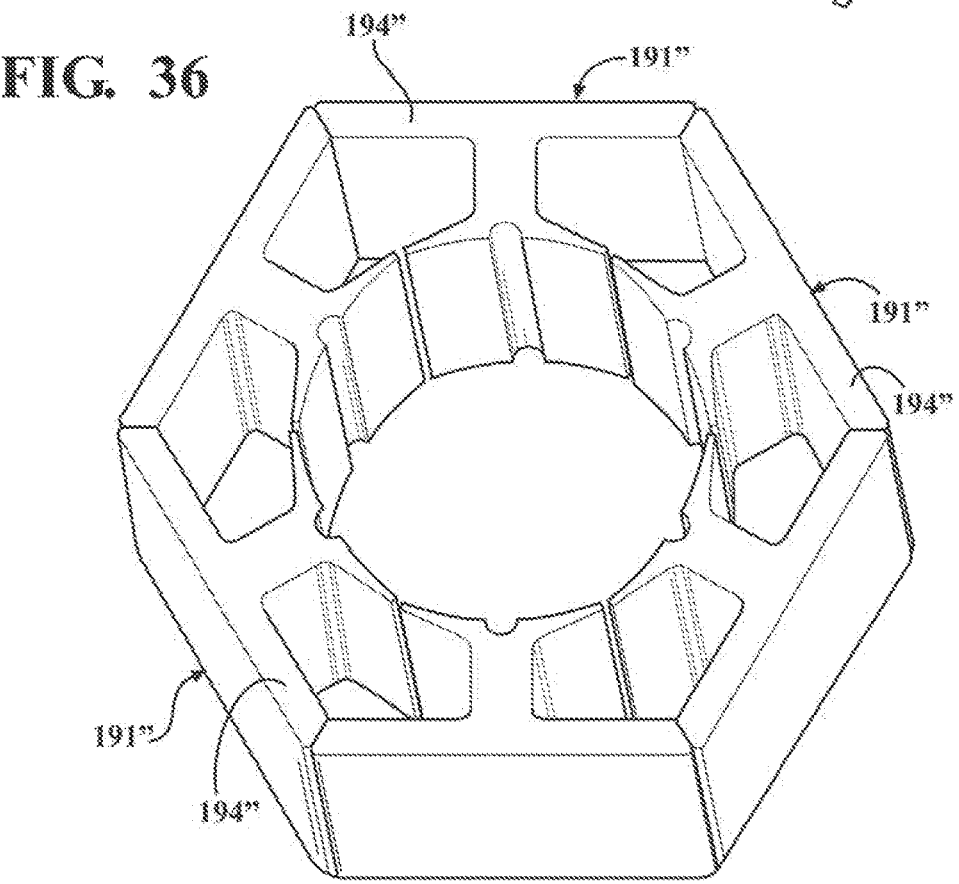

Alternatively, as best shown in FIGS. 36 and 37, each carrier 191" can omit the female and male connectors (i.e., the electromagnetic outer ring segments 194" are notchless). Instead, the outer ring segment 194" includes a first edge profile that is planar or flat, as best shown in FIG. 37. Similarly, the outer ring segment 194" also includes a second edge profile opposite the first edge profile that is also planar for abutting with the planar first edge profile of another electromagnetic sub-assembly 191" upon assembly. The carriers 191" can therefore utilize a distribution of loads to remain intact (similar in principle to an arch) when assembled. Again, the specific number of carriers 191" utilized can be selected based on a particular application.

The stator unit 170' defines the outer peripheral surface 180' that has a polygonal (e.g., hexagonal) cross-section can also provide for ease of assembly of the motor assembly 104'. For example, the planar outer ring segments 194' of each of the electromagnetic sub-assemblies 190' function as locating features for assembly of the stator unit 170' which are not available with electromagnetic sub-assemblies 190' in which the outer ring segments 194' are arcuate (i.e., to form an outer peripheral surface 180' of the stator unit 170' having a circular cross-section as in stator unit 170 described above). Additionally, the planar outer ring segments 194' provide a flat inner surface 204' of each outer ring segment 194', which can simplify automation of copper windings of winding unit (e.g., similar to winding unit 192 described above) around web segment 198'. The area or gap between the outer ring segment 194' and inner ring segment 196' of each of the electromagnetic sub-assemblies 190' can be larger as compared to electromagnetic sub-assemblies 190 described above in the first embodiment in which the outer ring segments 194 are arcuate. The larger area or gap between the outer ring segment 194' and inner ring segment 196' of each of the electromagnetic sub-assemblies 190' allows for more copper or increased size of the winding unit (e.g., winding unit 192 or bus bar). As a result, the motor assembly 104' may have a reduced motor resistance and improved heat control. As discussed above, because the outer peripheral surface 180' has a polygonal cross-section, motor chamber 132' of actuator housing 102' can be shaped to contour and engage the outer peripheral surface 180', providing an anti-rotation function. Consequently, it may not be necessary to fasten the stator unit 170' to the actuator housing 102' using glue or another type of fastener.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stator unit for a brushless direct current (BLDC) electric motor assembly, comprising:
   a plurality of electromagnetic subassemblies each including a carrier and a winding unit;
   the carrier including an outer ring segment being planar and an inner ring segment being arcuate and a web segment interconnecting the outer ring segment and the inner ring segment, wherein the inner ring segment and outer ring segment are interconnected with the web segment prior to assembly with the winding unit; and
   the plurality of electromagnetic subassemblies adapted to abut one another in an annular arrangement upon assembly, wherein the outer ring segments define an outer peripheral surface of the stator unit having a polygonal cross-section and the inner ring segments define a rotor cavity of the stator unit having a circular cross-section.

2. The stator unit of claim 1, wherein each outer ring segment includes a first edge profile defining a female connector and a second edge profile opposite the first edge profile and defining a male connector for coupling with the female connector of another outer ring segment upon assembly of the plurality of electromagnetic subassemblies.

3. The stator unit of claim 1, wherein each outer ring segment includes a first edge profile being planar and a second edge profile opposite the first edge profile and being planar for coupling with the planar first edge profile of another outer ring segment upon assembly of the plurality of electromagnetic subassemblies.

4. The stator unit of claim 1, wherein the winding unit of each of the plurality of electromagnetic subassemblies includes an upper rail segment and a lower rail segment interconnected a pair of laterally-spaced leg segments to define a generally rectangular aperture.

5. The stator unit of claim 4, wherein the outer ring segment of each of the plurality of electromagnetic subassemblies defines an inner surface and the inner ring segment of each of the plurality of electromagnetic subassemblies defines an outer surface and the laterally-spaced leg segments are configured to engage the inner surface of the outer ring segment and the outer surface of the inner ring segment.

6. The stator unit of claim 5, wherein the outer ring segment of the each of the plurality of electromagnetic subassemblies extends between a first edge profile and a second edge profile and the inner surface of the outer ring segment is flat and a gap is defined between the inner surface of the outer ring segment and the outer surface of the inner ring segment, the gap being larger nearest to the first edge profile and the second edge profile and smaller nearest the web segment.

7. The stator unit of claim 4, further including a pair of electrical terminal pins extending from the upper rail segment of the winding unit of each of the plurality of electromagnetic subassemblies.

8. The stator unit of claim 1, wherein the rotor cavity of the stator unit is cylindrically shaped.

9. The stator unit of claim 1, wherein the carrier is monolithic.

10. A stator unit for a brushless direct current (BLDC) electric motor assembly, comprising:
    a plurality of electromagnetic subassemblies each including a carrier and a winding unit;
    the carrier including an outer ring segment and an inner ring segment and a web segment interconnecting the outer ring segment and the inner ring segment, wherein the outer ring segment has a linear cross-section viewed longitudinally and a linear cross-section viewed laterally and the inner ring segment has a linear cross-section viewed longitudinally and a curvilinear cross-section viewed laterally, wherein the inner ring segment and outer ring segment are interconnected with the web segment prior to assembly with the winding unit; and
    the plurality of electromagnetic subassemblies adapted to abut one another in an annular arrangement upon assembly, wherein the outer ring segments define an outer peripheral surface of the stator unit and the inner ring segments define a rotor cavity of the stator unit.

11. The stator unit of claim 10, wherein the carrier comprises a plurality of separate layers stacked on top of one another longitudinally and laminated together.

12. The stator unit of claim 10, wherein the outer peripheral surface of the stator unit has a polygonal cross-section and the rotor cavity of the stator unit has a circular cross-section.

13. The stator unit of claim 10, wherein each outer ring segment includes a first edge profile defining a female connector and a second edge profile opposite the first edge profile and defining a male connector for coupling with the female connector of another outer ring segment upon assembly of the plurality of electromagnetic subassemblies.

14. The stator unit of claim 10, wherein each outer ring segment includes a first edge profile being planar and a second edge profile opposite the first edge profile and being planar for coupling with the planar first edge profile of another outer ring segment upon assembly of the plurality of electromagnetic subassemblies.

15. The stator unit of claim 10, wherein the rotor cavity of the stator unit is cylindrically shaped.

16. A powered actuator unit for use in a motor vehicle, comprising:
    an actuator housing having a motor section including an inner wall surface defining a motor chamber therein;

a brushless direct current (BLDC) electric motor assembly disposed in the motor section of the actuator housing and including a stator unit having a plurality of electromagnetic subassemblies each including a carrier, wherein the carrier includes an outer ring segment being planar and an inner ring segment that is arcuate and a web segment interconnecting the outer ring segment and the inner ring segment;

the plurality of electromagnetic subassemblies adapted to abut one another in an annular arrangement upon assembly, wherein the outer ring segments define an outer peripheral surface of the stator unit having a polygonal cross-section and the inner ring segments define a rotor cavity of the stator unit having a circular cross-section; and the stator unit configured to be non-rotatably mounted in motor chamber.

17. The powered actuator unit of claim 16, wherein the motor chamber of the actuator housing is shaped to contour and engage the polygonal cross-section of the outer peripheral surface to prevent rotation of the stator unit within the motor chamber.

18. The powered actuator unit of claim 16, wherein the stator unit is configured to be in a press-fit engagement with the inner wall surface of the motor chamber without fasteners.

19. The powered actuator unit of claim 16, wherein the motor section of the actuator housing defines at least one cooling opening extending into the motor chamber for cooling the motor assembly.

20. The powered actuator unit of claim 16, wherein each outer ring segment of the stator unit includes a first edge profile defining a female connector and a second edge profile opposite the first edge profile and defining a male connector for coupling with the female connector of another outer ring segment upon assembly of the plurality of electromagnetic subassemblies.

21. The powered actuator unit of claim 16, wherein each outer ring segment of the stator unit includes a first edge profile being planar and a second edge profile opposite the first edge profile and being planar for coupling with the planar first edge profile of another outer ring segment upon assembly of the plurality of electromagnetic subassemblies.

* * * * *